United States Patent
Kim et al.

(10) Patent No.: US 7,593,732 B2
(45) Date of Patent: Sep. 22, 2009

(54) SYSTEM AND METHOD FOR SUPPORTING SOFT HANDOVER IN A BROADBAND WIRELESS ACCESS COMMUNICATION SYSTEM

(75) Inventors: So-Hyun Kim, Suswon-si (KR);
Chang-Hoi Koo, Seongnam-si (KR);
Jung-Je Son, Seongnam-si (KR);
Hyoung-Kyu Lim, Seoul (KR);
Yeong-Moon Son, Anyang-si (KR);
Sung-Jin Lee, Suwon-si (KR);
Hyun-Jeong Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 457 days.

(21) Appl. No.: 11/153,209

(22) Filed: Jun. 15, 2005

(65) Prior Publication Data

US 2006/0003767 A1 Jan. 5, 2006

(30) Foreign Application Priority Data

Jun. 15, 2004 (KR) .................. 10-2004-0044239

(51) Int. Cl.
*H04W 36/00* (2009.01)
(52) U.S. Cl. ...................... 455/436; 455/442
(58) Field of Classification Search .......... 455/442, 455/436
See application file for complete search history.

(56) References Cited

U.S. PATENT DOCUMENTS 6,038,450 A * 3/2000 Brink et al. ................ 455/442

| | | | | |
|---|---|---|---|---|
| RE37,787 E | * | 7/2002 | Uddenfeldt et al. | 455/442 |
| 6,526,039 B1 | * | 2/2003 | Dahlman et al. | 370/350 |
| 6,708,036 B2 | * | 3/2004 | Proctor et al. | 455/446 |
| 6,810,256 B2 | * | 10/2004 | Stuempert et al. | 455/439 |

(Continued)

FOREIGN PATENT DOCUMENTS

EP 0 902 551 3/1999

(Continued)

OTHER PUBLICATIONS

Changhoi Koo et al., "Comments on IEEE 802.16e Handoff Draft", Mar. 11, 2003.

(Continued)

*Primary Examiner*—Patrick N. Edouard
*Assistant Examiner*—Shantell Heiber
(74) *Attorney, Agent, or Firm*—The Farrell Law Firm, LLP

(57) ABSTRACT

A method for supporting handover in a BWA communication system is provided. The system includes an MS, a serving BS, and a plurality of neighbor BSs. The coverage area of each of the BSs is divided into sectors using different subcarrier bands. The MS collects information broadcast from the serving BS on the serving BS and the neighbor BS, measures a signal level for each of the sectors of the serving BS and the neighbor BSs according to the collected information, and sends a handover request based on the measured signal level for each of the sectors. The serving BS broadcasts information on the serving BS and the neighbor BS to the MS, determines if the MS can perform a soft handover from its current sector to another sector upon receiving the handover request from the MS, and permits the MS to perform the soft handover if possible.

17 Claims, 12 Drawing Sheets

U.S. PATENT DOCUMENTS

| | | | |
|---|---|---|---|
| 7,113,786 B2* | 9/2006 | Proctor, Jr. | 455/442 |
| 2003/0224774 A1* | 12/2003 | Cheng et al. | 455/422.1 |
| 2004/0063441 A1* | 4/2004 | Diao et al. | 455/456.1 |
| 2004/0176094 A1* | 9/2004 | Kim et al. | 455/438 |
| 2004/0224691 A1* | 11/2004 | Hadad | 455/442 |

FOREIGN PATENT DOCUMENTS

| | | |
|---|---|---|
| JP | 09-187055 | 7/1997 |
| JP | 11-136730 | 5/1999 |
| JP | 11-178036 | 7/1999 |
| JP | 2001-238248 | 8/2001 |
| JP | 2002-111627 | 4/2002 |
| JP | 2002-526000 | 8/2002 |
| JP | 2002-300628 | 10/2002 |
| JP | 2004-529524 | 9/2004 |
| WO | WO 98/33288 | 7/1998 |
| WO | WO 03/081938 | 10/2003 |

OTHER PUBLICATIONS

Hang Zhang et al., "Soft Handover and Fast BS Switching Procedure", Jun. 25, 2004.

Changhoi Koo et al., "Enhanced Handover Mechanism for Supporting Active BS Set in IEEE P802.16e/D1-2004", Mar. 5, 2004.

* cited by examiner

SYSTEM AND METHOD FOR SUPPORTING SOFT HANDOVER IN A BROADBAND WIRELESS ACCESS COMMUNICATION SYSTEM

PRIORITY

This application claims priority under 35 U.S.C. § 119 to an application entitled "System and Method for Supporting Soft Handover in a Broadband Wireless Access Communication System" filed in the Korean Intellectual Property Office on Jun. 15, 2004 and assigned Ser. No. 2004-44239, the contents of which are incorporated herein by reference.

BACKGROUND OF THE INVENTION

1. Field of the Invention

The present invention relates generally to a Broadband Wireless Access (BWA) communication system, and in particular, to a system and method for supporting soft handover in a BWA communication system using an Orthogonal Frequency Division Multiple Access (OFDMA) scheme.

2. Description of the Related Art

Extensive research into a $4^{th}$ generation (4G) communication system, which is the next generation communication system, is being conducted to provide users with services having various Qualities-of-Service (QoSs) at a data rate of about 100 Mbps. Generally, the current $3^{rd}$ generation (3G) communication system supports a data rate of about 384 Kbps in an outdoor channel environment that provides only relatively poor channel conditions, and supports up to a data rate of 2 Mbps in an indoor channel environment that provides relatively good channel conditions. A wireless Local Area Network (LAN) system and a wireless Metropolitan Area Network (MAN) system generally support a data rate of 20 to 50 Mbps.

Presently, extensive research of the 4G communication system is being conducted to develop a new communication system capable of supporting mobility and QoS in the wireless LAN system and the wireless MAN system, both of which guarantee a relatively high data rate, in order to support a high-speed service that the 4G communication system aims to provide. The typical communication systems include an Institute of Electrical and Electronics Engineers (IEEE) 802.16a communication system and an IEEE 802.16e communication system. The wireless MAN system is suitable to support a high-speed communication service because it has broad coverage and supports a high data rate. However, the wireless MAN system does not take into consideration the mobility of users, or subscriber stations, or handover due to fast movement of the subscriber stations.

FIG. 1 is a diagram illustrating a configuration of a conventional IEEE 802.16e communication system. Referring to FIG. 1, the IEEE 802.16e communication system has a multicell structure, i.e. has a cell 100 and a cell 150, and includes a base station (BS) 110 managing the cell 100, a BS 140 managing the cell 150, and a plurality of mobile stations (MSs) 111, 113, 130, 151 and 153. Signal exchange between the base stations 110 and 140 and the MSs 111, 113, 130, 151 and 153 is achieved using an Orthogonal Frequency Division Multiplexing (OFDM) scheme or an Orthogonal Frequency Division Multiple Access (OFDMA) scheme. Among the MSs 111, 113, 130, 151 and 153, the MS 130 is located in a boundary region of the cell 100 and the cell 150, i.e. a handover region. In order to support the mobility of MS 130, it is necessary to support a handover for the MS 130.

The wireless MAN system, which is a BWA communication system, has broader coverage and supports a higher data rate as compared to the wireless LAN system. An IEEE 802.16a/d communication system is known as a communication system employing the OFDM/OFDMA scheme to support a broadband transmission network to physical channels for the wireless MAN system. The IEEE 802.16a/d communication system is a typical example of a BWA communication system using the OFDM/OFDMA scheme.

The IEEE 802.16a/d communication system, as it applies the OFDM/OFDMA scheme to the wireless MAN system, can support high-speed data transmission by transmitting physical channel signals using a plurality of subcarriers. In addition, an IEEE 802.16e communication system is a system improved to support the mobility of subscriber stations in the IEEE 802.16a/d communication system. That is, both of the IEEE 802.16a/d communication system and the IEEE 802.16e communication system are BWA communication systems using the OFDM/OFDMA scheme.

FIG. 2 is a diagram illustrating an uplink/downlink frame structure in a conventional BWA communication system using an OFDM/OFDMA scheme. Referring to FIG. 2, the uplink/downlink frame structure includes a preamble part, a broadcast control part, and a data transmission part. The preamble part transmits a synchronization (SYNC) signal used for acquiring SYNC between a BS and a subscriber station, i.e. a preamble sequence. The broadcast control part includes a downlink MAP (DL-MAP) part and an uplink MAP (UL-MAP) part. The DL-MAP part is a part through which a DL-MAP message is transmitted, and information elements (IEs) included in the DL-MAP message are shown in Table 1. The data transmission part can be divided into partial-usage-of-subchannels (PUSC) and full-usage-of-subchannels (FUSC). The PUSC part and the FUSC part can be distinguished in the same frame on a time-division basis.

The PUSC scheme allocates only particular subchannels from among all of the subchannels for each sector. It is possible to avoid inter-sector interference by allocating different PUSC subchannel parts to two adjacent sectors.

However, the FUSC scheme allocates all of the subchannels to every sector in every cell. Therefore, the FUSC scheme corresponds to operating at a frequency reuse factor of '1'. The FUSC scheme, although it can use all of the subchannels in every sector, creates a different subcarrier set for subchannels for each sector in order to minimize inter-subchannel interference of each sector. That is, the FUSC subchannels should be designed such that a hit probability that subcarriers for the subchannels overlap each other should be minimized. In order to support soft handover to a subscriber station, two sectors should be able to allocate the same subchannels. However, it is impossible for the subscriber station to perform soft handover with a subchannel or message format defined in the current IEEE 802.16 standard.

TABLE 1

| Syntax | Size | Notes |
|---|---|---|
| DL-MAP_Message_Format( ) { | | |
|   Management Message Type=2 | 8 bits | |
|   PHY Synchronization Field | Variable | See appropriate PHY specification |
|   DCD Count | 8 bits | |
|   Base Station ID | 18 bits | |
|   Begin PHY Specific Section { | | See applicable PHY section |
|     for(i=1; 1<=n; i++) { | | For each DL-MAP element 1 to n |

TABLE 1-continued

| Syntax | Size | Notes |
|---|---|---|
|     DL-MAP_IE( ) | variable | See corresponding PHY specification |
|     } | | |
|   } | | |
|   if!(byte boundary) { | | |
|     Padding Nibble | 4 bits | Padding to reach byte boundary |
|   } | | |
| } | | |

As shown in Table 1, a DL-MAP message includes a plurality of IEs, i.e. a Management Message Type indicating a type of the transmission message, a physical (PHY) Synchronization Field which is set according to a modulation scheme and a demodulation scheme applied to a physical channel for SYNC acquisition, a DCD Count indicating a count that depends from a change in the configuration of a Downlink Channel Description (DCD) message including a downlink burst profile, a Base Station ID indicating a base station identifier (ID), and a 'Number of DL-MAP Elements n' indicating the number of elements succeeding the Base Station ID. In particular, although not shown in Table 1, the DL-MAP message includes information of the ranging codes allocated to each of rangings described below.

Similarly, the UL-MAP part is a part through which a UL-MAP message is transmitted, and IEs included in the UL-MAP message are shown in Table 2.

TABLE 2

| Syntax | Size | Notes |
|---|---|---|
| UL-MAP_Message_Format( ) { | | |
|   Management Message Type=3 | 8 bits | |
|   Uplink Channel ID | 8 bits | |
|   UCD Count | 8 bits | |
|   Allocation Start Time | 32 bits | |
|   Begin PHY Specific Section { | | See applicable PHY section |
|     for(i=1; 1<=n; i++) { | | For each UL-MAP element 1 to n |
|       UL-MAP_IE( ) | variable | See corresponding PHY specification |
|     } | | |
|   } | | |
|   if!(byte boundary) { | | |
|     Padding Nibble | 4 bits | Padding to reach byte boundary |
|   } | | |
| } | | |

As shown in Table 2, the UL-MAP message includes a plurality of IEs, i.e. a Management Message Type indicating a type of the transmission message, an Uplink Channel ID indicating an uplink channel ID used, a UCD Count indicating a count that depends from a change in the configuration of an Uplink Channel Descript (UCD) message including an uplink burst profile, and a 'Number of UL-MAP Elements n' (not shown in Table 2) indicating the number of elements succeeding the UCD Count. The uplink channel ID is uniquely allocated in a media access control (MAC) sublayer.

The data transmission part corresponds to time slots, which are allocated to subscriber stations on a time division multiplexing (TDM)/time division multiple access (TDMA) basis. The base station transmits broadcast information to be broadcasted to its subscriber stations though a DL-MAP part 211 of the downlink frame, using a predetermined center carrier. Upon power on, the subscriber stations each monitor all of the frequency bands preset thereto and detect a pilot channel signal having the highest strength, i.e. the highest pilot carrier-to-interference and noise ratio (CINR). Each subscriber station determines a BS that transmitted the pilot channel signal having the highest pilot CINR as a BS to which it currently belongs, and can acquire control information for controlling its own uplink and downlink, and information on actual data transmission/reception points by analyzing a DL-MAP part and an UL-MAP part of a downlink frame transmitted from the BS.

A format of the UCD message is shown in Table 3.

TABLE 3

| Syntax | Size | Notes |
|---|---|---|
| UCD-Message_format( ) { | | |
|   Management Message Type=0 | 8 bits | |
|   Uplink channel ID | 8 bits | |
|   Configuration Change Count | 8 bits | |
|   Mini-slot size | 8 bits | |
|   Ranging Backoff Start | 8 bits | |
|   Ranging Backoff End | 8 bits | |
|   Request Backoff Start | 8 bits | |
|   Request Backoff End | 8 bits | |
|   TLV Encoded Information for the overall channel | Variable | |
|   Begin PHY Specific Section { | | |
|     for(i=1; i<n; i++) | | |
|       Uplink_Burst_Descriptor | Variable | |
|     } | | |
|   } | | |
| } | | |

As shown in Table 3, the UCD message includes a plurality of IEs, i.e. a Management Message Type indicating a type of the transmission message, an Uplink Channel ID indicating an uplink channel ID, a Configuration Change Count counted in BS, a Mini-slot Size indicating a size of mini-slots in an uplink physical channel, a Ranging Backoff Start indicating a start point of a backoff using an initial ranging (i.e. indicating a size of an initial backoff window using an initial ranging), a Ranging Backoff End indicating an end point of a backoff using the initial ranging (i.e. indicating a size of a final backoff window), a Request Backoff Start indicating a start point of a backoff for contention data and requests (i.e. indicating a size of an initial backoff window), and a Request Backoff End indicating an end point of a backoff for contention data and requests (i.e. indicating a size of a final backoff window). The backoff value indicates the type of waiting time value for which a subscriber station should wait for the next ranging upon its failure in rangings described below, and when a subscriber station fails in ranging, a base station should transmit to the subscriber station the backoff value, which is information of a time for which it should wait for the next ranging. For example, if a value determined from the Ranging Backoff Start and the Ranging Backoff End is '10', the subscriber station should perform the next ranging after passing $2^{10}=1024$ ranging opportunities by a truncated binary exponential backoff algorithm.

The DL-MAP message is periodically broadcast from a base station to all of the subscriber stations, and an occasion on which a subscriber station can continuously receive the DL-MAP message is referred to as "sync is detected." That is, subscriber stations receiving the DL-MAP message can receive all messages transmitted through a downlink channel.

As described above with reference to Table 3, when a subscriber station fails to access a base station, the base station transmits to the subscriber station the UCD message including the backoff information.

In a process of performing the ranging, the subscriber station transmits a ranging request (RNG-REQ) message to the base station, and the base station receiving the RNG-REQ message transmits to the subscriber station a ranging response (RNG-RSP) message including the above-stated information in order to correct the frequency, time and transmission power.

A format of the RNG-REQ message is shown in Table 4.

TABLE 4

| Syntax | Size | Notes |
| --- | --- | --- |
| RNG-REQ_Message_Format( ) { | | |
| Management Message Type=4 | 8 bits | |
| Downlink Channel ID | 8 bits | |
| TLV Encoded Information | variable | TLV specific |
| } | | |

In Table 4, a Downlink Channel ID indicates a downlink channel ID included in an RNG-REQ message that the subscriber station has received through the UCD message.

A format of the RNG-RSP message corresponding to the RNG-REQ message of Table 4 is shown in Table 5.

TABLE 5

| Syntax | Size | Notes |
| --- | --- | --- |
| RNG-RSP_Message_Format( ) { | | |
| Management Message Type=5 | 8 bits | |
| Uplink Channel ID | 8 bits | |
| TLV Encoded Information | variable | TLV specific |
| } | | |

As described above, the IEEE 802.16a communication system takes into consideration only fixed subscriber stations, i.e. does not consider the mobility of the subscriber stations, and considers only a unicell structure. However, the IEEE 802.16e communication system, as described above, is defined as a system that considers the mobility of subscriber stations in the IEEE 802.16d communication system. Therefore, the IEEE 802.16e communication system should consider the mobility of subscriber stations in a multicell environment. In order to provide for the mobility of the subscriber stations in the multicell environment, the subscriber stations and the base station essentially require a change in their operations due to the movement of the subscriber stations. extensive research into the handover of the subscriber stations is being performed taking into consideration the multicell structure in order to support the mobility of subscriber stations.

In the BWA communication system, a subscriber station receives preambles transmitted from a plurality of base stations. The subscriber station measures CINRs of the received preambles, and selects a BS corresponding to the highest CINR from among the measured CINRs. That is, the subscriber station (SS) selects a BS having the best reception state from among the base stations that have transmitted the preamble channels, thereby recognizing a base station to which it currently belongs. The base station having the best reception state will be referred to as a "serving BS."

The serving BS transmits a Neighbor Advertisement (MOB_NBR-ADV) message to the SS. A format of the MOB_NBR-ADV message is shown in Table 6.

TABLE 6

| Syntax | Size | Notes |
| --- | --- | --- |
| MOB_NBR-ADV_Message_Format( ) { | | |
| Management Message Type=49 | 8 bits | |
| Operator ID | 24 bits | Unique ID assigned to the operator |
| N_NEIGHBORS | 8 bits | |
| For (j=0; j<N_NEIGHNORS; j++) { | | |
| Neighbor BS-ID | 48 bits | |
| Physical Frequency | 32 bits | |
| Configuration Channel Count | 8 bits | Incremented each time the information for the associated neighbor BS has changed. |
| Hysteresis threshold | 8 bits | |
| MAHO report period | 8 bits | |
| TLV Encoded Neighbor information | Variable | TLV specific |
| } | | |
| } | | |

As shown in Table 6, the MOB_NBR-ADV message includes a plurality of IEs, i.e. a Management Message Type indicating a type of the transmission message, a Configuration Change Count indicating the number of changes in the configuration, an N_NEIGHBORS indicating the number of neighbor BSs, a Neighbor BS-ID indicating IDs of the neighbor BSs, a Physical Frequency indicating the physical channel frequencies for the neighbor BSs, and a TLV (Type/Length/Value) Encoded Neighbor Information indicating the other information related to the neighbor BSs. In addition, the MOB_NBR-ADV message includes a Hysteresis threshold on which an SS can issue a handover request, and a MAHO (Mobile Assisted Handover) report period for periodical scan report.

The SS, receiving the MOB_NBR-ADV message, transmits a Scanning Interval Allocation Request (MOB_SCN-REQ) message to the serving BS when it desires to scan CINRs of preambles transmitted from its neighbor BSs. The time when the SS issues a scan request is not directly related to a CINR scanning operation for the preamble signals, so a detailed description thereof will be omitted.

A format of the MOB_SCN-REQ message is shown in Table 7.

TABLE 7

| Syntax | Size | Notes |
| --- | --- | --- |
| MOB_SCN-REQ_Message_Format( ) { | | |
| Management Message Type=? | 8 bits | |
| Scan Duration | 16 bits | Units are frames. |
| } | | |

As shown in Table 7, the MOB_SCN-REQ message includes a plurality of IEs, i.e. a Management Message Type indicating a type of the transmission message, and a Scan Duration indicating scan duration for which an SS desires to scan CINRs of preamble signals transmitted from the neighbor BSs. The Scan Duration is created on a frame-by-frame basis. In Table 7, the Management Message Type for transmission of the MOB_SCN-REQ message is currently undefined (Management Message Type=undefined).

The serving BS, receiving the MOB_SCN-REQ message, transmits to the SS a MOB_SCN-RSP message including information to be scanned by the SS. A format of the MOB_SCN-RSP message is illustrated in Table 8.

TABLE 8

| Syntax | Size | Notes |
|---|---|---|
| MOB_SCN-RSP_Message_Format( ) { | | |
| Management Message Type=51 | 8 bits | |
| CID | 16 bits | basic CID of the MSS |
| Duration | 12 bits | in frames |
| Start Frame | 4 bits | |
| } | | |

As shown in Table 8, the MOB_SCN-RSP message includes a plurality of IEs, i.e. a Management Message Type indicating a type of the transmission message, a CID indicating a connection ID of the SS that transmitted the MOB_SCN-REQ message, and a Duration indicating the scan duration. In Table 8, Management Message Type for transmission of the MOB_SCN-RSP message is currently undefined (Management Message Type=undefined), and the scan duration indicates the duration for which the SS performs the pilot CINR scanning.

The SS, receiving the MOB_SCN-RSP message including the scanning information, scans for pilot CINRs of neighbor BSs that it has recognized through the MOB_NBR-ADV message according to the scanning information parameters.

In the IEEE 802.16e communication system, in order to support a handover, an SS should measure the CINRs of the preamble signals transmitted from its neighbor BSs and its serving BS to which it currently belongs. When a CINR of the preamble signal transmitted from the serving BS is less than the CINRs of the preamble signals transmitted from the neighbor BSs, the SS sends a handover request to the serving BS. Herein, for convenience, "measuring a CINR of a preamble signal" will be referred to as "scanning a CINR of a preamble signal."

FIG. 3 is a diagram illustrating a sector structure in a BWA communication system using an OFDM/OFDMA scheme. Referring to FIG. 3, one base station is divided into three sectors, and each sector can be distinguished by beam forming by sectorized antennas. All of the sectors belonging to the same BS use the same center frequency, and each sector uses a unique divided bandwidth with different subchannel sets. However, the specification does not specify whether this subchannel concept divides only the data part or divides the full band into three equal parts.

FIG. 4 is a signaling diagram illustrating a hard handover process initiated at the request of an MSS in a conventional IEEE 802.16e communication system. Referring to FIG. 4, a serving BS 440 transmits a MOB_NBR-ADV message to a mobile station (MS) 400 (Step 411). The MS 400 receiving the MOB_NBR-ADV message transmits a MOB_SCN-REQ message to the serving BS 440 to request a scan of the CINRs of the pilot signals received from its neighbor BSs (Step 413). The time when the MSS 400 issues a scan request is not directly related to the pilot CINR scanning operation, so a detailed description thereof will be omitted. The serving BS 440 receiving the MOB_SCN-REQ message transmits to the MS 400 a MOB_SCN-RSP message including information to be scanned by the MS 400 (Step 415). The MS 400, receiving the MOB_SCN-RSP message including the scanning information, performs the CINR scanning on the pilot signals according to certain parameters, i.e. scan duration, included in the MOB_SCN-RSP message, for neighbor BSs recognized through the MOB_NBR-ADV message (Step 417).

After the completion of the scanning of the CINRs of the pilot signals received from the neighbor BSs, if the MS 400 determines to change its serving BS (Step 419), i.e. determines to replace the current serving BS with a new serving BS, the MS 400 transmits a Mobile Station Handover Request (MOB_MSHO-REQ) message to the serving BS 440 (Step 421). The format of the MOB_MSHO-REQ message is shown in Table 9.

TABLE 9

| Syntax | Size | Notes |
|---|---|---|
| MOB_MSHO-REQ_Message_Format( ) { | | |
| Management Message Type=53 | | |
| For (j=0; j<N_Recommended; j++) { | | N_Recommended can be derived from the known length of the message |
| Neighbor BS-ID | 48 bits | |
| BS CINR mean | 8 bits | |
| Service level prediction | 8 bits | |
| Estimated HO start | 8 bits | |
| } | | |
| Estimated HO start | 8 bits | The estimated HO time shall be the time for the recommended target BS |
| } | | |

As shown in Table 9, the MS_MSSHO-REQ message includes a plurality of IEs, i.e. a Management Message Type indicating a type of the transmission message, and an N_Recommended indicating the number of a scanning result of an MS. The N_Recommended, as shown in Table 9, includes a Neighbor BS-ID indicating IDs of neighbor BSs, a BS CINR mean indicating a CINR of a pilot signal for each of the neighbor BSs, and a Service level prediction indicating a predicted service level that the neighbor BSs will provide to an MS. In addition, the N_Recommended includes an Estimated HO start parameter indicating an estimated time when the handover will occur.

Upon receiving the MOB_MSHO-REQ message transmitted from the MS 400, the serving BS 440 acquires a target BS list from the N_Recommended information in the MOB_MSHO-REQ message (Step 423). The serving BS 440 transmits the Handover Notification (HO_NOTIFICATION) messages to the neighbor BSs belonging to the possible target BS list (Steps 425 and 427). It is assumed herein that the neighbor BSs included in the target BS list include a target BS#1 460 and a target BS#2 480. A format of the HO_NOTIFICATION message transmitted from the serving BS 440 to the target BSs 460 and 480 is shown in Table 10.

TABLE 10

| Field | Size | Notes |
| --- | --- | --- |
| Global Header | 152 bit | |
| For (j=0; j<Num_Records; j++) { | | |
| MS unique identifier | 48 bit | 48-bit unique identifier used by MS (as provided by the MSS or by the I-am-host-of message) |
| Estimated Time to HO | 16 bit | In millisecond, relative to the time stamp. A value of 0 indicates that the estimated time is unknown. |
| Required BW | 8 bit | Bandwidth which is required by MSS (to guarantee minimum packet data transmission) |
| Required QoS | 8 bit | Name of Service Class representing AuthorizedQoSParam Set |
| } | | |

TABLE 10-continued

| Field | Size | Notes |
| --- | --- | --- |
| Security field | TBD | A means to authenticate this message |
| CRC field | 32 bit | IEEE CRC-32 |

As shown in Table 10, the HO_NOTIFICATION message includes a plurality of IEs, i.e. an MS unique identifier indicating an ID of an MS that requests a handover to the target BS#1 460 or the target BS#2 480, an Estimated Time to HO indicating an estimated time when the handover will start, a Required BW indicating a bandwidth that the MS requires from a neighbor BS which will become a new serving BS, and a Required QoS indicating a QoS level desired by the MS. The bandwidth and QoS level required by the MS are equal to the information recorded in the Service Level Prediction field of the MOB_MSHO-REQ message shown in Table 9.

Upon receiving the HO_NOTIFICATION messages transmitted from the serving BS 440, the target BS#1 460 and the target BS#2 480 each transmit a Handover Notification Response (HO_NOTIFICATION-RESPONSE) message to the serving BS 440 in response to the HO_NOTIFICATION messages (Steps 429 and 431). The formation of the HO_NOTIFICATION-RESPONSE message is shown in Table 11.

TABLE 11

| Field | Size | Notes |
| --- | --- | --- |
| Global Header | 152 bits | |
| For(j=0; j<Num Records; j++) { | | |
| MS unique identifier | 48 bits | 48 bit unique identifier used by MS (as provided by the MSS or by the I-am-host-of message) |
| BW Estimated | 8 bits | Bandwidth which is provided by BS (to guarantee minimum packet data transmissions) TBD how to set this field |
| QoS Estimated | 8 bits | Quality of Service level Unsolicited Grant Service (UGS) Real-time Polling Service (rtPS) Non-real-time Polling Service (nrtPS) Best Effort |
| ACK/NACK | 8 bits | Acknowledgement or Negative acknowledgement 1 is Acknowledgement which means that the neighbor BS accepts the HO-notification message from the Serving BS 0 is Negative Acknowledgement which means that the neighbor BS may not accept the HO-notification message from the Serving BS |
| } | | |
| security field | TBD | A means to authenticate this message |
| CRC field | 32 bits | IEEE CRC-32 |

As shown in Table 11, the HO_NOTIFICATION-RESPONSE message includes a plurality of IEs, i.e. an MS unique identifier indicating an ID of an MSS that desires to perform the handover to the target BSs, an ACK/NACK indicating whether the target BSs can accept the handover request from the MS, a BW Estimated indicating a bandwidth that the target BSs can provide to the MS, and a QoS Estimated indicating a QoS level that the target BSs can provide.

If the HO_NOTIFICATION-RESPONSE messages are received from the target BS#1 460 and/or the target BS#2 480 in steps 429 and 431, the serving BS 440 selects target BSs that can provide the bandwidth and QoS level required by the MS 400 when the MS 400 moves thereto. For example, in step 429, the target BS#1 460 transmits the HO_NOTIFICATION-RESPONSE message including information indicating that it can provide a low QoS level to the MS 400, and in step 431, the target BS#2 480 transmits the HO_NOTIFICATION-RESPONSE message including information indicating that it can provide the same QoS level to the MS 400. In step 433, the serving BS 440 selects the target BS#2 480 that can provide the same QoS level, and transmits a Handover Notification Confirm (HO_NOTIFICATION_CONFIRM) message in response to the HO_NOTIFICATION-RESPONSE message from the selected target BS#2 480. The format of the HO_NOTIFICATION_CONFIRM message is shown in Table 12.

TABLE 12

| Field | Size | Notes |
|---|---|---|
| Global Header | 152 bits | |
| For(j=0; j<Num Records; j++) { | | |
| MS unique identifier | 48 bits | 48 bit universal MAC address of the MS (as provided to the BS on the RNG-REQ message) |
| BW Estimated | 8 bits | Bandwidth which is provided by BS (to guarantee minimum packet data transmissions) TBD how to set this field |
| QoS Estimated | 8 bits | Quality of Service level Unsolicited Grant Service (UGS) Real-time Polling Service (rtPS) Non-real-time Polling Service (nrtPS) Best Effort |
| } | | |
| security field | TBD | A means to authenticate this message |
| CRC field | 32 bits | IEEE CRC-32 |

As shown in Table 12, the HO_NOTIFICATION_CONFIRM message includes a plurality of IEs, i.e. an MS unique identifier indicating an ID of an MS 400 that requests a handover to the selected target BSs, a BW Estimated indicating a bandwidth that the MS 400 can receive from the target BSs, and a QoS Estimated indicating a QoS level that MS 400 can receive from the target BSs.

After selecting the target BSs in step 433, the serving BS 440 transmits a Handover Response (MOB_HO-RSP) message to the MS 400 in response to the MOB_MSHO-REQ message (Step 435). The format of the MOB_HO-RSP message is shown in Table 13.

TABLE 13

| Syntax | Size | Notes |
|---|---|---|
| MOB_BSHO-RSP_Message_Format( ) { | | |
|   Management Message Type=54 | 8 bits | |
|   Estimated HO start | 8 bits | |
|   For(j=0; j<N_Recommended; j++) { | | Neighbor base stations shall be presented in an order such that the first presented is the one most recommended and the last presented is the least recommended. N_Recommended can be derived from the known length of the message. |
|     Neighbor BS-ID | 48 bits | |
|     Service level prediction | 8 bits | |
|   } | | |
| } | | |

As shown in Table 13, the MOB_HO-RSP message includes a plurality of IEs, i.e. a Management Message Type indicating a type of the transmission message, an Estimated HO start indicating an estimated time when an handover process will start, and an N_Recommended indicating a target BS selection result of the serving BS. The N_Recommended, as shown in Table 13, includes a Neighbor BS-ID indicating the IDs of the selected target BSs, and a Service level prediction indicating a predicted service level that the selected target BSs will provide to the MS 400.

Upon receiving the MOB_HO-RSP message, the MS 400 selects a target BS to which it will perform a handover to, depending on the N_Recommended information included in the MOB_HO-RSP message. After selecting the target BS, the MS 400 transmits a Handover Indication (MOB_HO_IND) message to the serving BS 440 to the serving BS 440 in response to the MOB_HO-RSP message (Step 437). The format of the MOB_HO_IND message is shown in Table 14.

TABLE 14

| Syntax | Size | Notes |
|---|---|---|
| MOB_HO_IND_Message_Format ( ) { | | |
| Management Message Type=56 | 8 bits | |
| reserved | 6 bits | Shall be set to zero. |
| HO_IND_type | 2 bits | 00: serving BS release |
| | | 01: HO cancel |
| | | 10: HO reject |
| | | 11: Reserved |
| Target_BS_ID | 48 bits | Applicable only when HO_IND type is set to 00. |
| HMAC Tuple | 21 bytes | |
| } | | |

As shown in Table 14, the MOB_HO_IND message includes a plurality of IEs, i.e. a Management Message Type indicating a type of the transmission message, a Target_BS_ID indicating an ID of a target BS selected by the MS, and a HO_IND_type used when the MS informs the serving BS that it will release its connection for handover, or when the MS cancels or rejects the handover.

It is assumed in FIG. 4 that the MS 400 transmits the MOB_HO_IND message with the HO_IND_type='00' to the serving BS 440. The serving BS 440 releases the link to the MS 400 (Step 439). After transmitting the MOB_HO_IND message, the MS 400 starts a handover process to the target BS to which it will perform handover, i.e. the target BS#2 480.

The MS 400 can be allocated a contention-free ranging connection interval by receiving DL-MAP and UL-MAP, both of which includes a Fast ranging IE shown in Table 15. The MS 400 performs contention-free ranging with the target BS#2 480 (Steps 443 and 445). After completion of the ranging process, the MS 400 performs data exchange with the new serving BS 480 (Step 447). The Fast ranging IE is shown in Table 15.

TABLE 15

| Syntax | Size | Notes |
|---|---|---|
| Fast_UL_ranging_IE { | | |
| Extended UIUC | 4 bits | |
| MAC address | 48 bits | MSS MAC address as provided on the RNG-REQ message on initial system entry. |
| UIUC | 4 bits | UIUC≠15. A four-bit code used to define the type of uplink access and the burst type associated with that access. |
| OFDM Symbol offset | 10 bits | The offset of the OFDM symbol in which the burst starts, the offset value is defined in units of OFDM symbols and is relevant to the Allocation Start Time field given in the UL-MAP message. |
| Subchannel offset | 6 bits | The lowest index OFDMA subchannel used for carrying the burst, starting from subchannel 0. |
| No. OFDM Symbols | 10 bits | The number of OFDM symbols that are used to carry the UL Burst |
| No. Subchannels | 6 bits | The number OFDMA subchannels with subsequent indexes, used to carry the burst. |
| Reserved | 4 bits | |
| } | | |

As shown in Table 15, the Fast ranging IE includes, as information for fast ranging, a UIUC indicating a MAC address of the MS and a modulation/demodulation scheme to be used in an uplink, an OFDM Symbol offset indicating a ranging region, a Subchannel offset indicating a subchannel offset, a No.OFDM Symbols indicating the number of OFDM Symbols, and a No.Subchannels indicating the number of Subchannel.

SUMMARY OF THE INVENTION

As described above, when an MS moves from a particular sector of its current cell to a new sector of another cell in the conventional OFDMA-based 802.16e communication system, there is no detailed scheme proposed to support a soft handover. Conventionally, when an MS located in a cell boundary suffers a ping-pong effect, it should perform frequent hard handover. The ping-pong effect increases a signaling load on the system and increases a hard-handover failure probability. Therefore, there is a need to redefine a message and scenario for a soft handover of the MS.

It is, therefore, an object of the present invention to provide a system and method for supporting a soft handover of a mobile subscriber station (MSS) in a Broadband Wireless Access (BWA) communication system.

According to one aspect of the present invention, there is provided a method for supporting a handover in a Broadband Wireless Access (BWA) communication system having a mobile station (MS), a serving base station (BS) from which the MS is currently receiving a service, and a plurality of neighbor BSs being different from the serving BS, the coverage area of each of the BSs being divided into sectors using different subchannel bands. The method includes the steps of collecting, by the MS, information broadcasted from the serving BS on the serving BS and, the neighbor BSs; measuring a signal level for each of the sectors of the serving BS and the neighbor BSs according to the collected information; sending a handover request to the serving BS based on the measured signal level for each of the sectors; determining by the serving BS if the MS intends to perform a handover from a sector of the serving BS to another sector, based on the information included in the handover request; and permitting the MS to perform soft handover.

According to another aspect of the present invention, there is provided a system for supporting a handover to a mobile station (MS) in a Broadband Wireless Access (BWA) communication system. The system includes a serving base station (BS) from which the MS is currently receiving a service; and a plurality of neighbor BSs being different from the serving BS, the coverage area of each of the BSs being divided into sectors using different subchannel bands, wherein the MS collects periodically broadcast information on the serving BS, the neighbor BS, and the sectors, measures a signal level for each of the sectors of the serving BS and the neighbor BSs according to the collected information, and sends a handover request according to the measured signal level for each of the sectors, wherein the serving BS broadcasts information on the serving BS and the neighbor BS to the MS, determines if the MS can perform a soft handover from its current sector to another sector upon receiving the handover request from the MS, and permits the MS to perform a soft handover if possible.

According to further another aspect of the present invention, there is provided a method for performing by a mobile station (MS) a handover from a sector of a serving base station (BS) to a sector of a neighbor BS in a Broadband Wireless Access (BWA) communication system having the MS, the serving BS from which the MS is currently receiving a service, and a plurality of neighbor BSs being different from the serving BS, the coverage area of each of the BSs being divided into sectors using different subchannel bands. The method includes the steps of collecting information broadcast from the serving BS on the serving BS and the neighbor BSs; measuring a signal level for each of the sectors of the serving BS and the neighbor BSs according to the collected information; sending a handover request to the serving BS based on the measured signal level for each of the sectors; receiving from the serving BS a handover response including sector information of a possible neighbor BS to which the MS can perform a soft handover if a handover type determined in the serving BS is a soft handover; sending to the serving BS a notification indicating that the MS performs a soft handover; and performing ranging to a corresponding sector of the neighbor BS.

According to yet another aspect of the present invention, there is provided a method for supporting a handover by a serving base station (BS) in a Broadband Wireless Access (BWA) communication system having a mobile station (MS), the serving BS from which the MS is currently receiving a service, and a plurality of neighbor BSs being different from the serving BS, the coverage area of each of the BSs being divided into sectors using different subchannel bands. The method includes the steps of receiving a handover request from the MS; determining if the MS can perform soft handover from a sector of the serving BS to another sector of the neighbor BS; and permitting the MS to perform the soft handover if the MS can perform the soft handover from the sector of the serving BS to the sector of the neighbor BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
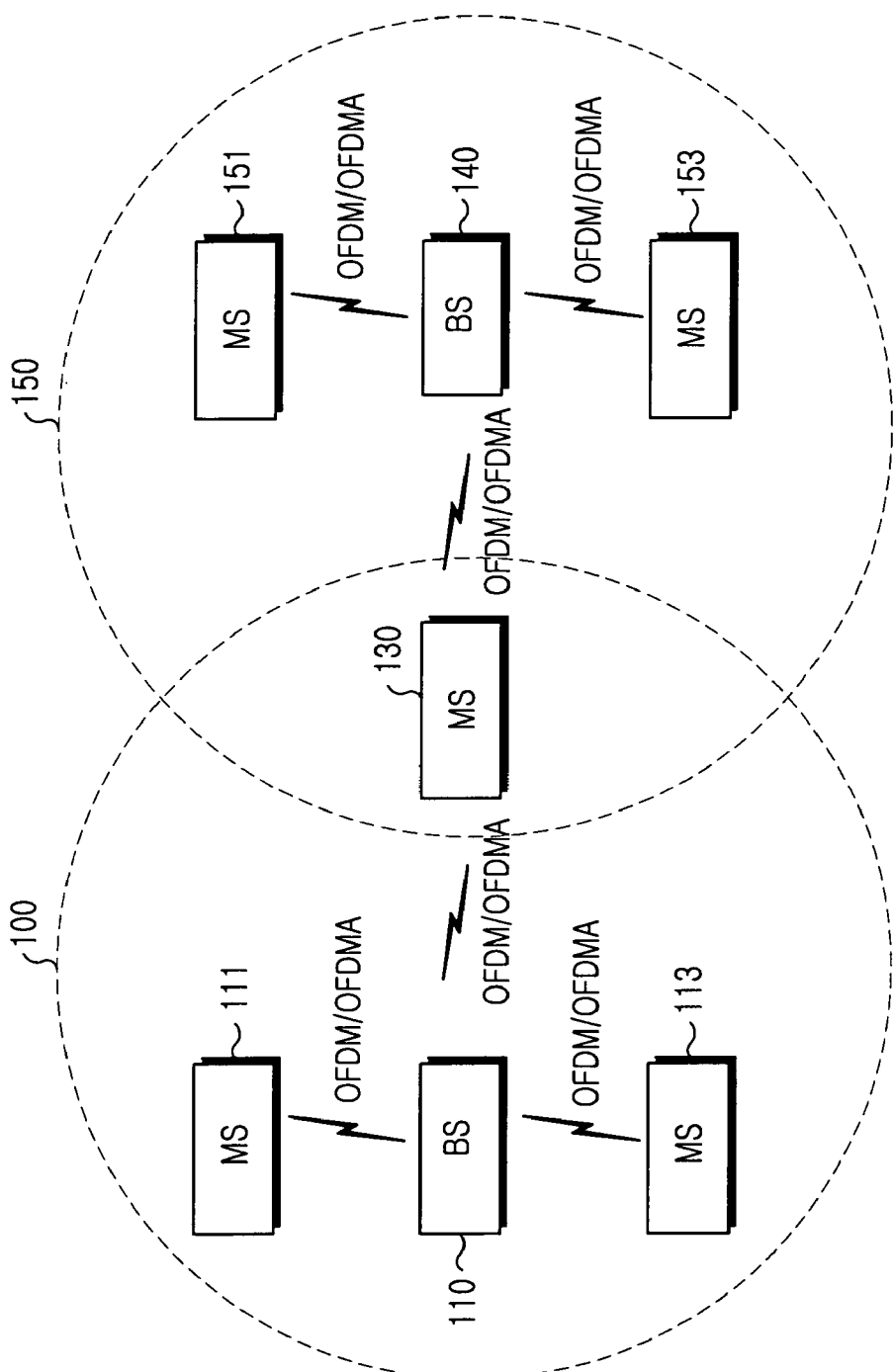
FIG. 1 is a diagram illustrating a configuration of a conventional IEEE 802.16e communication system.

Preferred embodiments of the present invention will now be described in detail with reference to the annexed drawings. In the following description, a detailed description of known functions and configurations incorporated herein has been omitted for conciseness.

Before a detailed description of the present invention, it should be noted that an Institute of Electrical and Electronics Engineers (IEEE) 802.16e communication system is a Broadband Wireless Access (BWA) communication system using an Orthogonal Frequency Division Multiplexing/Orthogonal Frequency Division Multiple Access (OFDM/OFDMA) scheme. For example, in the Broadband Wireless Access communication system, one cell can be divided into three sectors of alpha ($\alpha$), beta ($\beta$) and gamma ($\gamma$) by antenna beam forming, the sectors are divided with non-overlapping frequency bands, and the frequency bands are allocated to mobile stations (MSs). The frequency bands can be allocated to the MSs per subcarrier or per subchannel, which is a set of the subcarriers. Conventionally, when a MS moves from the current position to a new sector of its neighbor cell, the MS performs only a hard handover. That is, the MS releases a connection to its old serving BS, and then sets up a new connection to a selected target BS to which it will perform the handover.

The present invention provides a scheme for supporting soft handover when a MSS located in a particular sector of a cell managed by a first BS moves to a sector of a neighbor cell managed by the first BS or a second BS in an OFDMA communication system.

To this end, the present invention defines a term "soft active sector" to support the soft handover of the MSS.

soft active sector: is a sector where a soft handover is possible, and is a set of sectors satisfying a hysteresis threshold.

TABLE 16

| BS-ID { | |
|---|---|
| Base Station ID | 40 bit |
| Sector ID | 8 bit |
| } | |

In order to support soft handover of the MS, there is a need for the management of the soft active sector set. To this end, the present invention presents a procedure for adding or deleting the soft active sector by redefining the existing Mobile Neighbor Advertisement (MOB_NBR-ADV) message. The format of the modified MOB_NBR-ADV message is shown in Table 17.

TABLE 17

| Syntax | Size | Notes |
|---|---|---|
| MOB_NBR-ADV_Message_Format( ) { | | |
|   Management Message Type = 49 | 8 bits | |
|   Operator ID | 24 bits | Unique ID assigned to the operator |
|   N_NEIGHBORS | 8 bits | |
|   for(j=0; j< N_NEIGHBORs; j++) | | |
|     Neighbor BS-ID | 48 bits | |
|     DL Physical Frequency | 32 bits | |
|     Configuration Change Count | 8 bits | |
|   TLV Encoded Neighbor Information | | |
| } | | |
|   H_add | 8 bits | CINR reference value based on which a specific sector is added to a soft active sector set |
|   H_delete | 8 bits | CINR reference value based on which a specific sector is deleted from a soft active sector set |
|   HMAC Tuple | 21 bytes | |
| } | | |

The hysteresis threshold is a threshold range where a difference between carrier-to-interference and noise ratios (CINRs) for respective sectors satisfies a specific range value. For example, when a difference between a signal strength for an alpha sector where the current serving BS is located and a signal strength for a beta sector where a possible target BS is located falls within a predetermined value range, the MS can add the beta sector to its soft active sector set. When the MS performs a soft handover to the sector added to its soft active sector set, the soft handover is possible.

The MS should determine a soft handover request situation or recognize a handover to a sector of another cell, based on a CINR value measured by receiving information on neighbor sectors included in its handover request message. The MS transmits a handover request message to the current serving BS and receives a handover response message in response to the handover request message when its handover request time satisfies a handover condition regardless of whether a hard handover or a soft handover is to be performed. The MS performs hard handover or soft handover according to the received handover response message.

The MS requires identifiers (IDs) used for sector identification in order to perform a handover to a sector of a neighbor cell. The present invention redefines a 48-bit BS-ID field in the current 802.16e communication system, as shown in Table 16, in order to distinguish a base station and a sector.

As shown in Table 17, compared with the existing MOB_NBR-ADV message, the redefined MOB_NBR-ADV message further includes an H_add field indicating a CINR reference value for enabling the adding of a particular sector to a soft active sector set, and an H_delete field indicating a CINR reference value for enabling the deletion of a particular sector from the soft active sector set.

Figure 5:
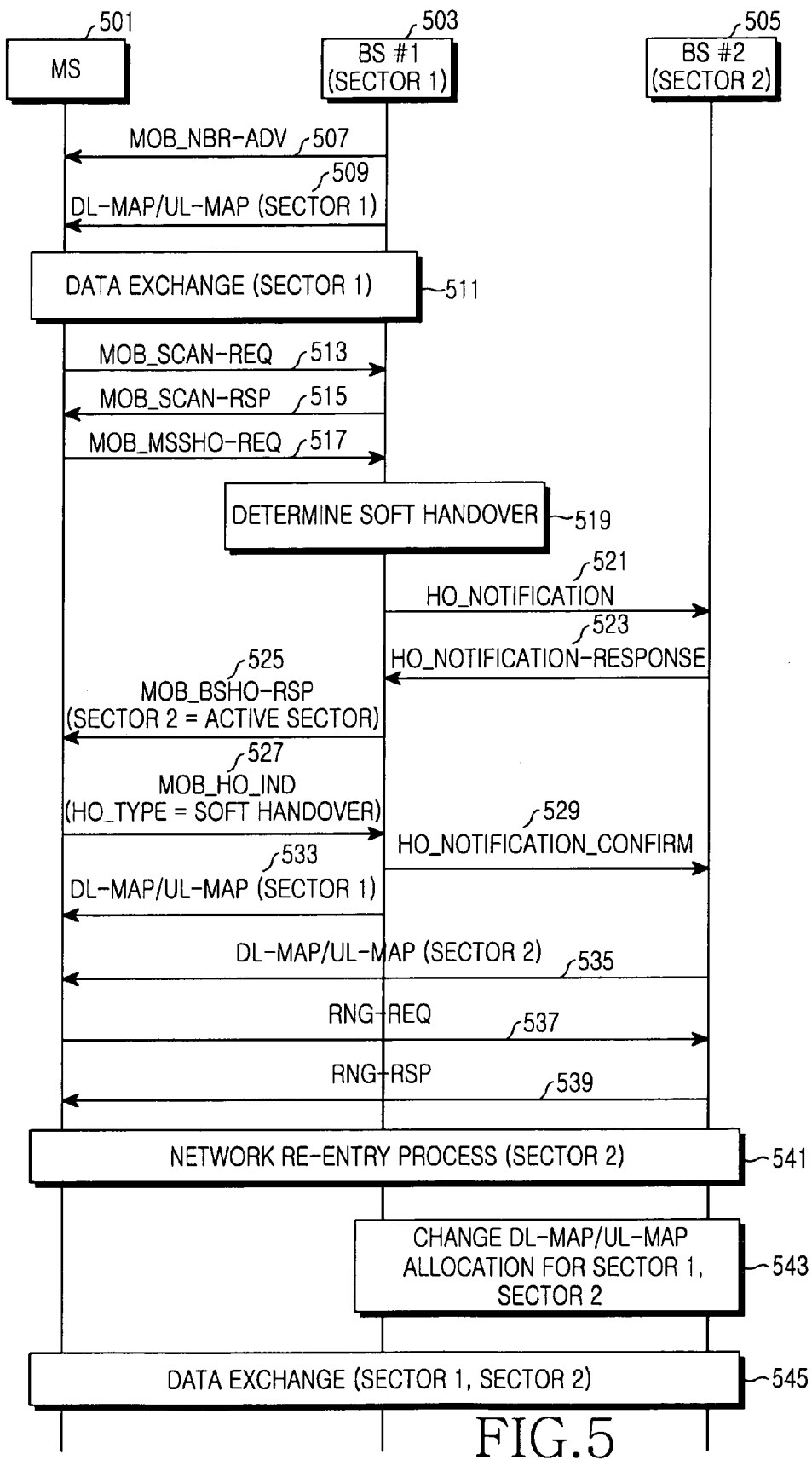
FIG. 5 is a signaling diagram illustrating a soft handover process initiated at the request of an MSS in an IEEE 802.16e communication system according to an embodiment of the preset invention.

FIG. 5 is a signaling diagram illustrating a soft handover process initiated at the request of an MS in an IEEE 802.16e communication system according to an embodiment of the preset invention. Referring to FIG. 5, an MS 501 is currently located in a sector#1 of a BS#1 503 which is a serving BS, and periodically receives information related to its neighbor BS and sector from the BS#1 503 through a MOB_NBR-ADV message (Step 507), and also receives a frame including DL-MAP/UL-MAP (Step 509). Step 507 and the step 509 are exchangeable with each other. Only the MSs belonging to the sector#1 can receive the DL-MAP/UL-MAP, i.e. broadcast control information. The MS 501 receiving the DL-MAP/UL-MAP performs data exchange with the BS#1 503 (Step 511). Thereafter, upon detecting its entry into a handover region, the MS 501 sends a scanning request for the sector#1 to the BS#1 503. That is, the MS 501 transmits a MOB_SCAN-REQ message to the BS#1 503 (Step 513). The BS#1 503 receiving the MOB_SCAN-REQ message transmits a MOB_SCAN-RSP message to the MSS 501 to inform the MS 501 of a scanning method (Step 515).

The MS 501 measures the CINR values of the preambles from the neighbor sectors according to the informed scanning method. In this case, if a preamble CINR value measured for another sector is greater than the CINR value for the sector#1 with which the MS 501 currently performs data exchange, the MS 501 transmits a MOB_MSHO-REQ message to the BS#1 503 (Step 517). The MOB_MSHO-REQ message is redefined by modifying the existing MOB_MSHO-REQ message, and a format of the modified MOB_MSHO-REQ message is shown in Table 18.

received can be a preamble that a base station of a cell where the MS is currently located, i.e. an anchor BS, has transmitted.

The BS#1 503 receiving the MOB_MSHO-REQ message determines to perform a soft handover for the MS 501, if it is determined from the MOB_MSHO-REQ message that the Arrival Time Difference value satisfies a value within a predetermined range, and a sector having the greatest CINR value and a sector having the next greatest CINR value are located in different sectors (Step 519). After determining to

TABLE 18

| Syntax | Size | Note |
| --- | --- | --- |
| MOB_MSHO-REQ_Message_Format( ) { | | |
|   Management Message Type = 53 | 8 bits | |
|   For (j=0; J<N_Recommended; j++) { | | N_Recommended can be derived from the known length of the message |
|     Neighbor BS-ID | 48 bits | |
|     BS CINR mean | 8 bits | |
|     Service level prediction | 8 bits | |
|     Arrival Time Difference Indication | 1 bits | |
|     if(Arrival Time Difference Indication == 1) { | | |
|       Arrival Time Difference | 8 bits | |
|     } | | |
|   } | | |
|   Estimated HO start | 8 bits | The estimated HO time shall be the time for the recommended target BS. |
|   HMAC Tuple | 21 bytes | Sec 11.4.11 |
| } | | |

As shown in Table 18, compared with the conventional MOB_MSHO-REQ message, the redefined MOB_MSHO-REQ message further includes a 1-bit Arrival Time Difference Indication field and an 8-bit Arrival Time Difference value field. The Arrival Time Difference Indication field is an indicator field for enabling a BS to recognize if a neighbor sector is included in an allowable SYNC range of a physical channel. In other words, the Arrival Time Difference Indication field is a field for indicating if it is possible to support soft handover. For example, the Arrival Time Difference Indication field=1 indicates that the neighbor sector is included in the allowable SYNC range of the physical channel, and this means that a soft handover to the neighbor sector is possible. The Arrival Time Difference value indicates a difference between an arrival time of the first arrived preamble from a BS included in the current active set and an arrival time of a preamble from a neighbor BS. The preamble that the MS first perform the soft handover for the MS 501, the BS#1 503 transmits a HO_NOTIFICATION message to neighbor BSs (herein, only BS#2 505), which determines if it can provide a communication service to the MS 501 (Step 521). The BS#2 505 receiving the HO_NOTIFICATION message transmits, to the BS#1 503, a HO_NOTIFICATION-RESPONSE message indicating whether it can provide a communication service to the MS 501 (Step 523). It is assumed that the BS#2 505 transmits an affirmative response indicating that it will provide a communication service to the MS 501.

The BS#1 503 receiving the HO_NOTIFICATION-RESPONSE message transmits a MOB_BSHO-RSP message to the MS 501 (Step 525). Compared with the conventional MOB_BSHO-RSP message, the redefined MOB_BSHO-RSP message further includes an indication value '4' for the service level prediction field. The indication value '4' indicates that it is possible to support a soft handover in a particular sector. The format of the redefined MOB_BSHO-RSP is shown in Table 19.

TABLE 19

| Syntax | Size | Notes |
| --- | --- | --- |
| MOB_BSHO-RSP_Message_Format( ) { | | |
|   Management Message Type = 54 | 8 bits | |
|   Estimated HO start | 8 bits | |
|   for(j=0; j<N_Recommended; j++){ | 4 bits | Shall be set to zero |
|     Neighbor BS-ID | 48 bits | |
|     Service level prediction | 48 bits | 0 = No service possible for this MSS |
| | | 1 = Some service is available for one or several Service Flows authorized for the MSS. |
| | | 2 = For each authorized Service Flow, a |

TABLE 19-continued

| Syntax | Size | Notes |
|---|---|---|
| | | MAC connection can be established with QoS specified by the AuthorizedQoSParamSet. |
| | | 3 = No service level prediction available. |
| | | 4 = Soft HO support |
| } | | |
| } | | |

The BS#1 503 transmits the MOB_BSHO-RSP message with the service level prediction field=4. The MS 501 receiving this message adds a sector#2 of the BS#2 505 to its soft active sector set and transmits a MOB_HO_IND message with HO_type='10' to the BS#1 503 (Step 527). Similarly, compared with the conventional MOB_HO_IND message, the redefined MOB_HO_IND message further includes a HO_type field. A format of the redefined MOB_HO_IND message is shown in Table 20.

active sector on a band-sharing basis, one of a soft handover (HO_type=10) and a hard handover (HO_type=00) can be optionally selected. This is because in this case, whether to support the soft handover or the hard handover does not depend on a configuration of a physical channel or a sector, but depends on a type of handover supported by the entire network.

Alternatively, the format of the MOB_HO_IND message can be defined as shown in Table 21.

TABLE 20

| Syntax | Size | Notes |
|---|---|---|
| MOB_HO_IND_Message_Format( ) { | | |
|   Management Message Type = 56 | 8 bits | |
|   HO_type | 2 bits | 00: Inter BS Hard HO |
| | | 01: Intra BS HO |
| | | 10: Inter BS Soft HO |
| | | 11: reserved |
|   reserved | 4 bits | Shall be set to zero |
|   if(HO_type = 00){ | | |
|     HO_IND_type | 2 bits | 00: Serving BS release |
| | | 01: HO cancel |
| | | 10: HO reject |
| | | 11: reserved |
|     Target_BS_ID | 48 bits | Applicable only when HO_IND type is set to 00 |
|   } | | |
|   if(HO_type = 10){ | | |
|     HO_IND_type | 2 bits | 00: Soft Active Sector delete |
| | | 01: HO cancel |
| | | 10: HO reject |
| | | 11: Soft Active Sector add |
|     Target_BS_ID | 48 bits | Applicable only when HO_IND type is set to 00 |
|   } | | |
|   HMAC Tuple | 21 bytes | |

As shown in Table 20, the redefined MOB_HO_IND message further includes a HO_type field, compared with the conventional MOB_HO_IND message. Describing the new 2-bit HO_type field, HO_type='00' is an inter-BS hard handover indicating that a MS performs the hard handover when it moves to a sector of another cell, HO_type='01' is an inter-BS handover indicating that a MS performs a handover when it moves to another sector in the same cell, and HO_type='10' is an inter-BS soft handover indicating that a MSS performs a soft handover when it moves to another sector. In a soft handover support scheme for allocating all of the same sub-bands for soft active sectors rather than a scheme for allocating only sub-bands for a newly added soft

TABLE 21

| Syntax | Size | Notes |
|---|---|---|
| MOB_HO_IND_Message_Format( ) { | | |
|   Management Message Type = 56 | 8 bits | |
|   reserved | 4 bits | Shall be set to zero |
|   HO_IND_type | 4 bits | 0000: Serving BS release |
| | | 0001: HO cancel |
| | | 0010: HO reject |
| | | 0011: Soft Active Sector delete |

TABLE 21-continued

| Syntax | Size | Notes |
|---|---|---|
| Target_BS_ID | 48 bits | 0100: Soft Active Sector add Sector add HO_IND_type = 0000 indicates a serving BS releasing a link to an MSS. HO_IND_type = 0100 indicates an added soft active sector. HO_IND_type = 0011 indicates a deleted soft active sector. |
| HMAC Tuple | 21 bytes | |

As shown in Table 21, compared with the conventional MOB_HO_IND message, the redefined MOB_HO_IND message has a modified HO_IND_type field, which is extended in length from 2 bits to 4 bits to add two options of '0011' and '0100'. A serving BS receiving the HO_IND_type='0011' recognizes that the MS deletes a corresponding sector of a target BS corresponding to the Target_BS_ID from its soft active sector set, and a serving BS receiving the HO_IND_type='0100' recognizes that the MSS adds a corresponding sector of a target BS corresponding to the Target_BS_ID to its soft active sector set.

The BS#1 503 receiving the MOB_HO_IND message shown in Table 20 or Table 21, transmits a HO_NOTIFICATION_CONFIRM message to the BS#2 505 (Step 529). If the MSS 501 adds a sector#2 of the BS#2 505 to its soft active sector set, it can perform signal transmission/reception in both the sector#1 of the BS#1 503 and the sector#2 of the BS#2 505. The MSS 501 receives DL-MAP/UL-MAP from the sector#1 of the BS#1 503 and the sector#2 of the BS#2 505 (Steps 533 and 535).

A ranging process is performed between the MS 501 and the sector#2 of the BS#2 505 through an exchange of RNG-REQ and RNG-RSP messages (Steps 537 and 539). After completion of the ranging process, the MS 501 and the BS#2 505 attempt a network re-entry process on the sector#2 when necessary (Step 541). After the network re-entry process is completed, the BS#1 503 changes the DL-MAP/UL-MAP allocation for the sector#1 and the sector#2 (Step 543), and the MS 501 performs data exchange with the two sectors (Step 545). In the case of an uplink, the MSS 501 selects one of the two sectors having the better link quality, before modulation. In the case of a downlink, the MS 501 combines signals received from the two sectors and demodulates the combined signals. In this case, the MOB_HO_IND message of Table 21 can be used.

Figure 6A:
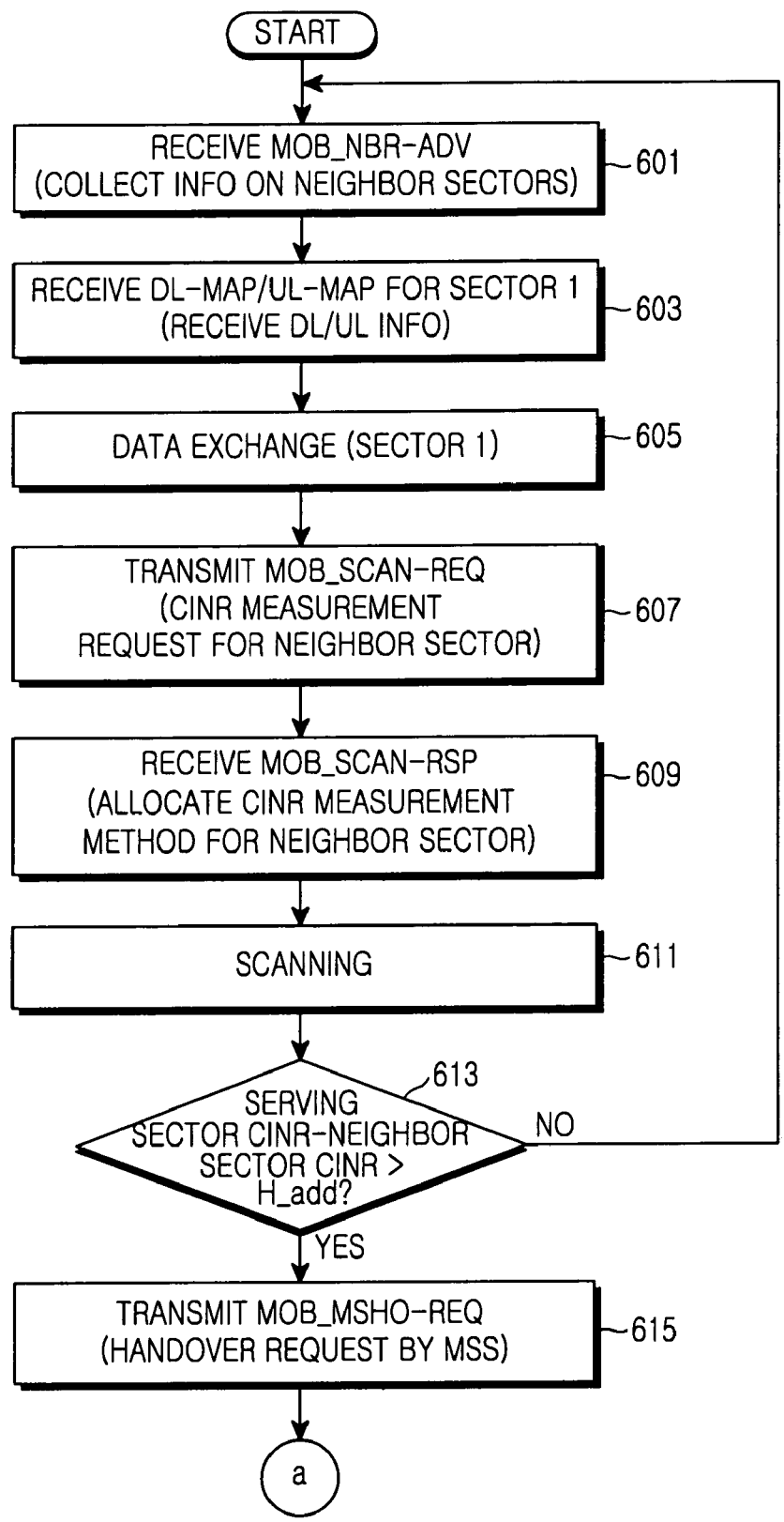
FIGS. 6A and 6B are flowcharts illustrating a soft handover process performed by an MSS in an IEEE 802.16e communication system according to an embodiment of the present invention.
Figure 6B:
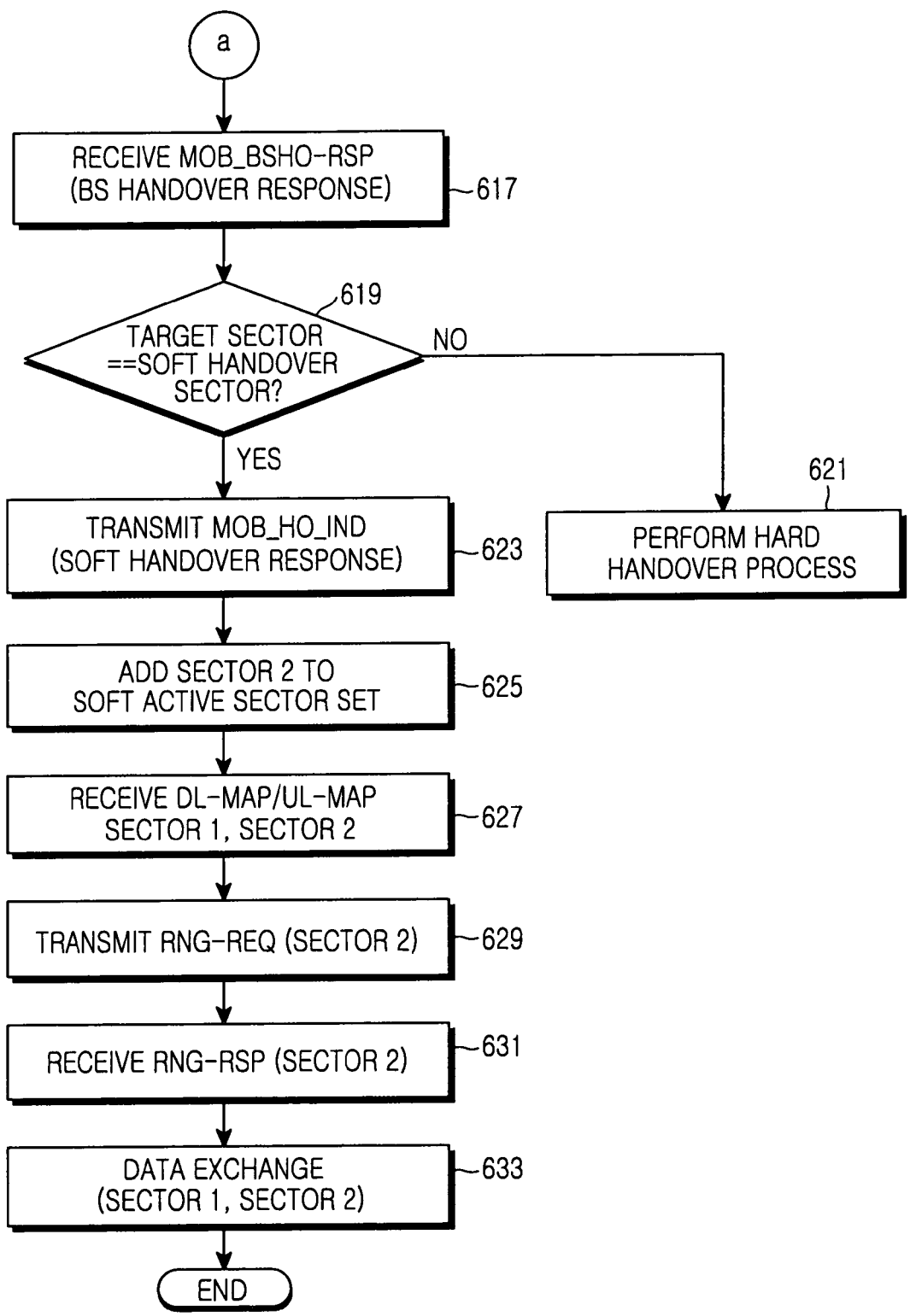

FIGS. 6A and 6B are flowcharts illustrating a soft handover process performed by a MS in an IEEE 802.16e communication system according to an embodiment of the present invention. Referring to FIGS. 6A and 6B, in step 601, the MS receives a MOB_NBR-ADV message from a serving BS and collects sector information of neighbor cells from the MOB_NBR-ADV message. In step 603, the MS receives a DL-MAP/UL-MAP corresponding to a sector#1 of the current serving BS. In step 605, the MS receiving the DL-MAP/UL-MAP performs data exchange with the sector#1. In step 607, the MS transmits a MOB_SCAN-REQ message, a scanning request message, to the serving BS at a scanning request time. In step 609, the MS receives a MOB_SCAN-RSP message from the serving BS in response to the MOB_SCAN-REQ message. In step 611, the MS measures the CINRs of the preambles from the neighbor sectors. In step 613, if the MS determines its entry into a handover region, or if a difference between a CINR value for the sector#1 of the serving BS and a CINR value for a sector#2 of a target BS which is a neighbor BS to which the MS can perform handover is less than a reference value H_add, the MS adds the sector#2 to its soft active sector set.

In step 615, the MS sends a handover request, or a MOB_MSHO-REQ message, to the serving BS. The MOB_MSHO-REQ message includes the sector information of the BS to which the MS requests handover.

Figure 2:
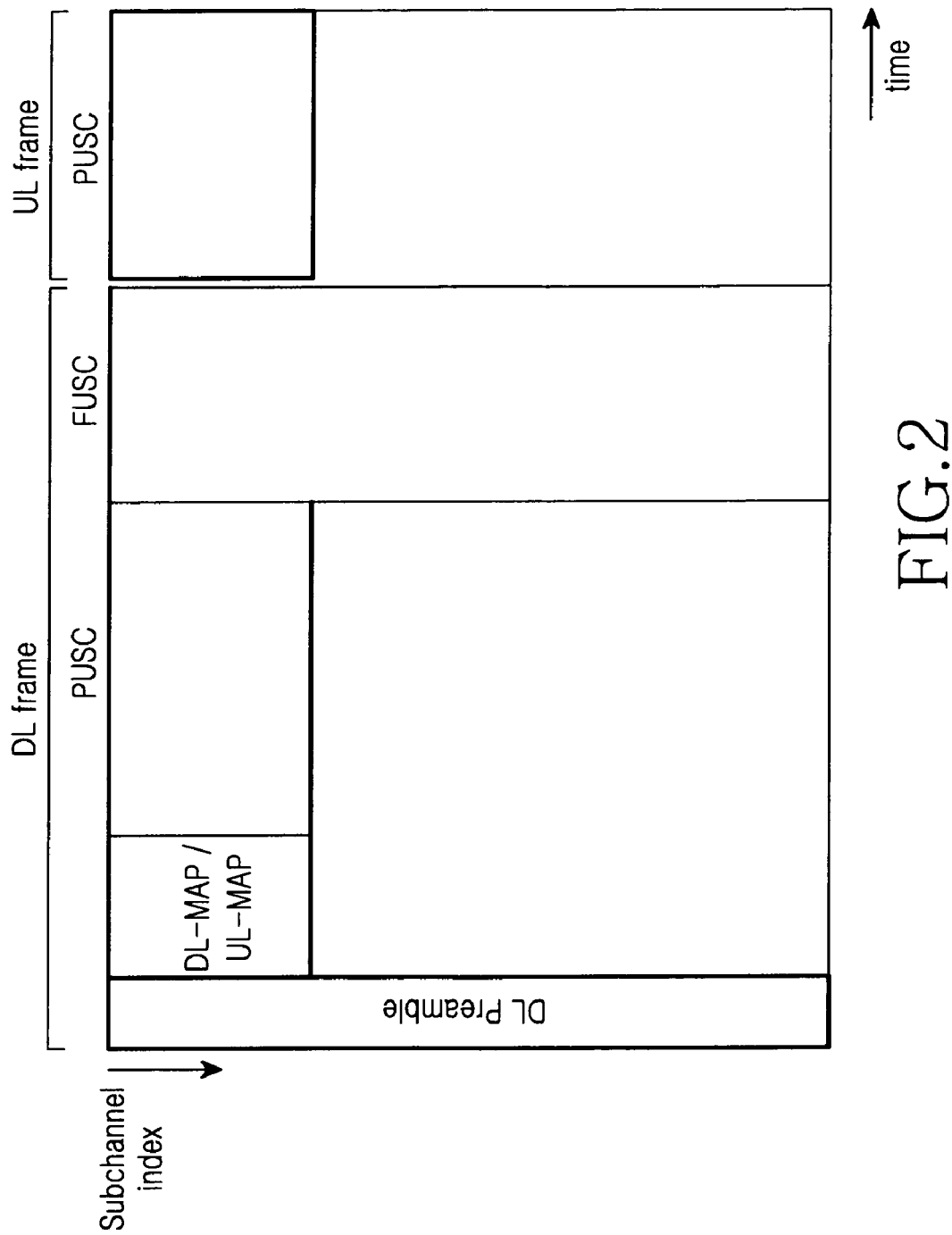
FIG. 2 is a diagram illustrating an uplink/downlink frame structure in a conventional BWA communication system using an OFDM/OFDMA scheme.
Figure 3:
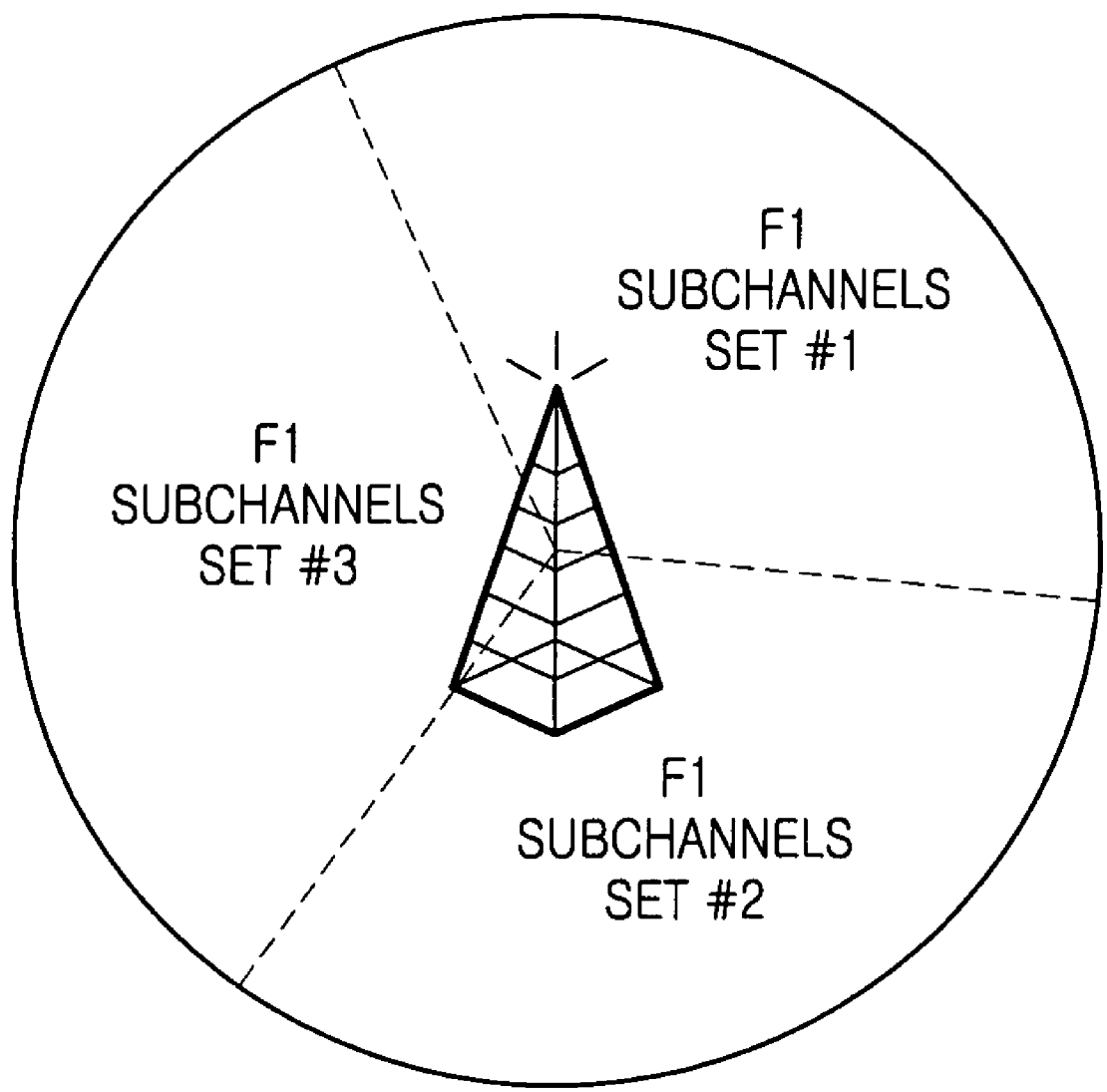
FIG. 3 is a diagram illustrating a sector structure in a BWA communication system using an OFDM/OFDMA scheme.
Figure 4:
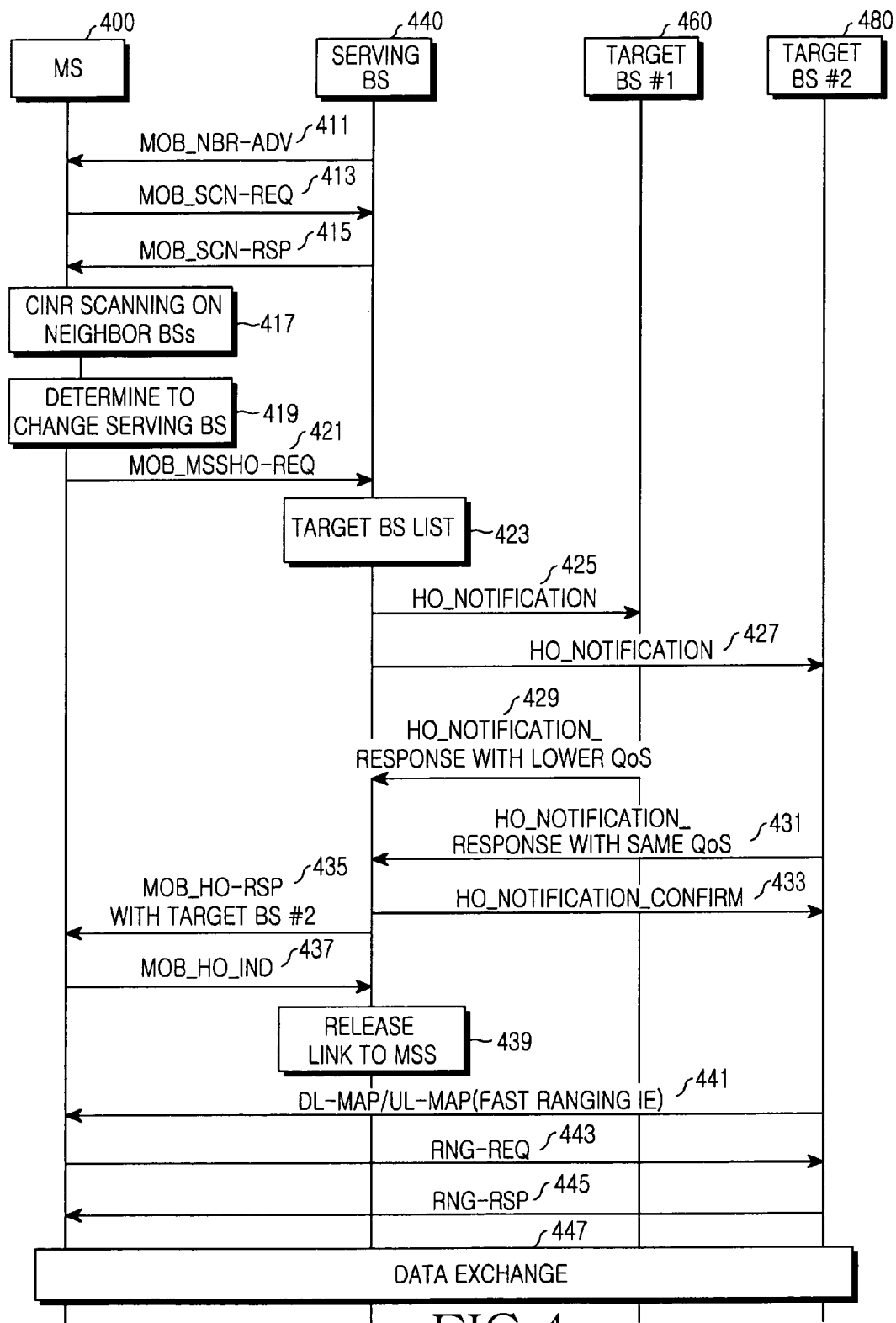
FIG. 4 is a signaling diagram illustrating a hard handover process initiated at the request of an MSS in a conventional IEEE 802.16e communication system.

In step 617, the MS receives a MOB_BSHO-RSP message, a handover response message, from the serving BS. In step 619, the MS determines if a desired handover sector of a BS, included in the MOB_BSHO-RSP message, is a sector to which the MS can perform soft handover (hereinafter referred to as a "target sector"). If it is determined that the target sector is included in the soft active sector set, enabling a soft handover, then the MSS proceeds to step 623. On the contrary, if soft handover to the target sector is impossible, the MS proceeds to step 621 where it performs a hard handover. In step 623, if the target sector belongs to the soft handover region and should be included in the soft active sector set, the MS specifies a soft handover in a HO_IND_type field and transmits a MOB_HO_IND message with the HO_IND_type field. In step 625, the MS adds the target sector (for example, the sector#2 of the BS#2 of FIG. 2) to its soft active sector set. In step 627, the MS receives the DL-MAP/UL-MAP from both the sector#1 of the current serving BS and the target sector (sector#2).

In step 629, the MS transmits a RNG-REQ message to the target sector. In step 631, the MS receives the RNG-RSP message from a BS corresponding to the target sector. In step 633, the MS performs data exchange with the sector#1 and the sector#2.

Figure 7A:
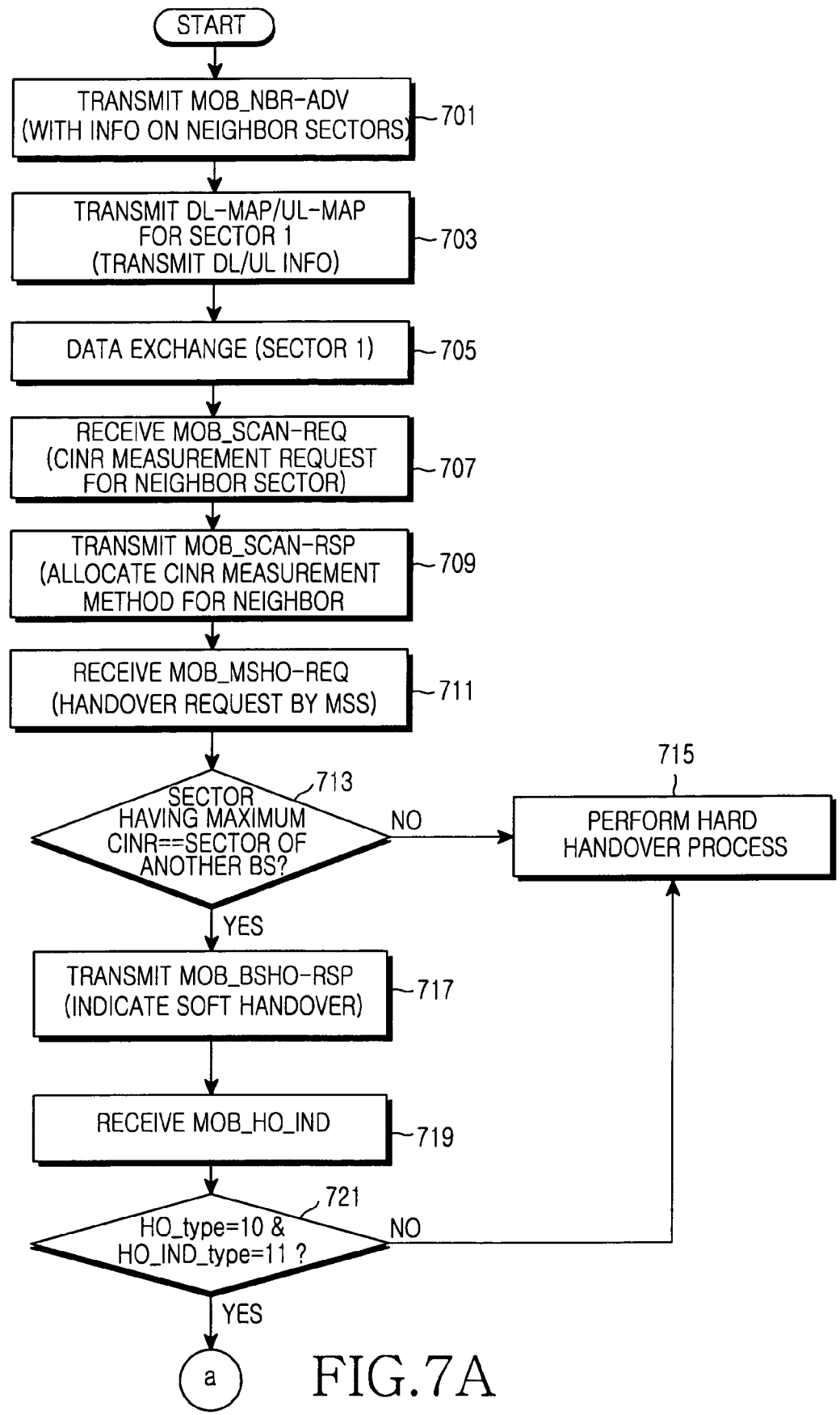
FIGS. 7A and 7B are flowcharts illustrating a soft handover process performed by a BS in an IEEE 802.16e communication system according to an embodiment of the present invention.
Figure 7B:
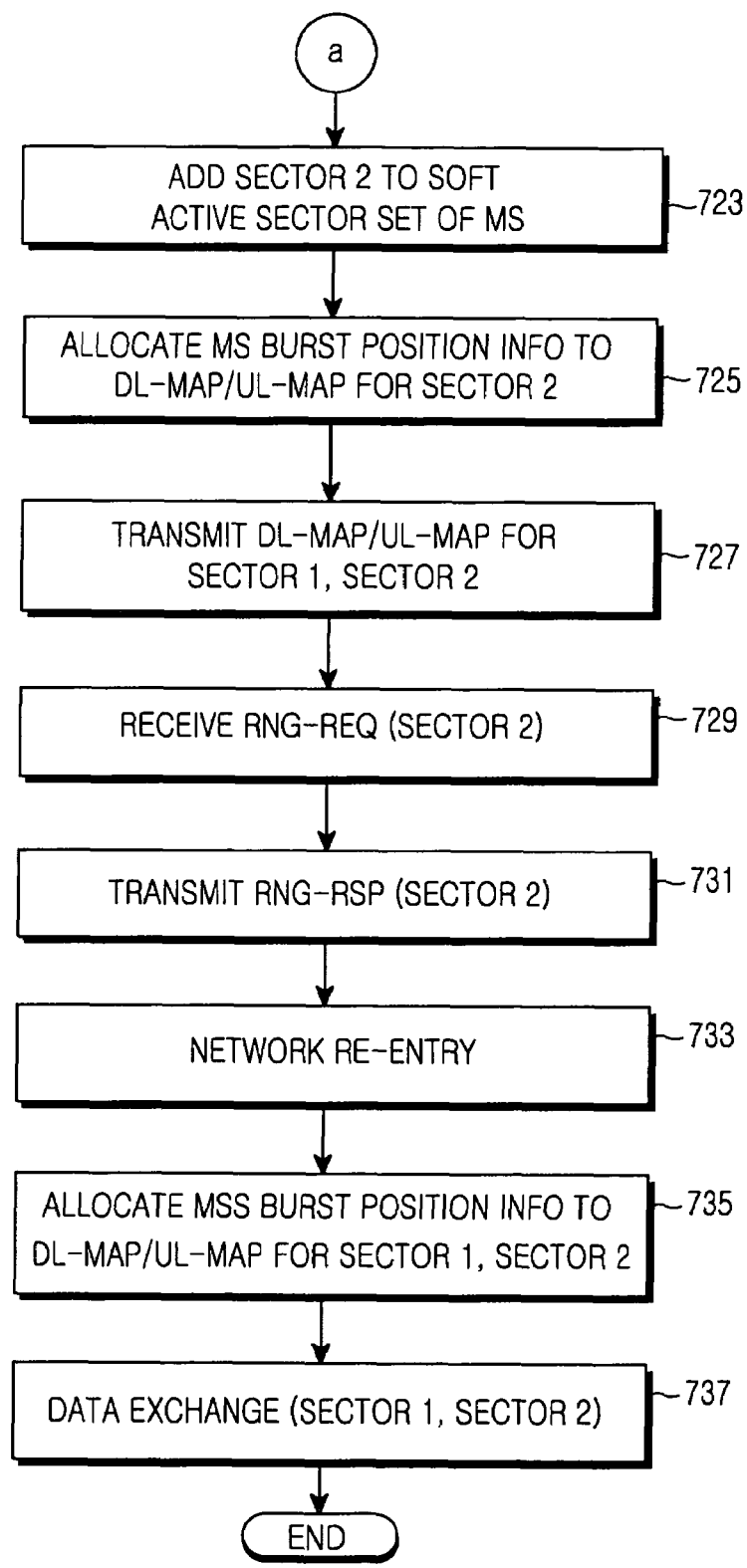

FIGS. 7A and 7B are flowcharts illustrating a soft handover process performed by a BS in an IEEE 802.16e communication system according to an embodiment of the present invention. Referring to FIGS. 7A and 7B, in step 701, a serving BS, which is providing a service to a MS (assumed to be located in a sector#1), transmits to the MS a MOB_NBR-ADV message including information on the sectors of the same cell and the neighbor cells. In step 703, the serving BS transmits the DL-MAP/UL-MAP of the sector#1 to the MS in order to inform the MS of a data transmission burst position. In step 705, the serving BS exchanges data with the MS. In step 707, the serving BS receives a MOB_SCAN-REQ message from the MS. In step 709, the serving BS transmits a MOB_SCAN-RSP message to the MS in response to the MOB_SCAN-REQ message, to inform the MS of a CINR measurement method for the sectors. In step 711, the serving BS receives a MOB_MSSHO-REQ message from the MS. In step 713, the serving BS determines if a neighbor sector showing a difference between a preamble CINR value for the sector#1, reported by the MS, and a value less than a reference value H_add is a sector using another subchannel band for another BS. If so, the serving BS proceeds to step 717, recognizing the soft handover. Alternatively, in step 713, the sector can determine if it supports a soft handover, at its discretion. In step 717, the serving BS transmits a MOB_BSHO-RSP message to the MS to inform the MS of the soft handover. In step 719, the serving BS receives a MOB_HO_IND message from the MS. If it is determined in step 713 that the neighbor sector is not a sector using another subchannel band for another BS, the serving BS proceeds to step 715 where it performs the conventional hard handover process.

In step 721, the serving BS determines if the HO_type of the MOB_HO_IND message is set to '10' indicating a soft handover and HO_IND_type is set to '11'. If so, the serving BS proceeds to step 723. However, if not, the serving BS proceeds to step 715 where it performs the conventional hard handover process. In step 723, the serving BS recognizes that the MS has added a target sector (sector#2) to its soft active sector set. In step 725, the serving BS allocates burst position information for the MS to the DL-MAP/UL-MAP parts of the sector#2. In step 727, the serving BS and the target BS transmit DL-MAP/UL-MAP to the MS.

Step 729 and its succeeding steps represent a process performed in a target BS to which the MS has requested to perform a soft handover to. In step 729, the target BS receives an RNG-REQ message from the MS. In step 731, the target BS transmits an RNG-RSP message to the MS in response to the RNG-REQ message. In step 733, the target BS and the MS perform a network re-entry process if needed. After completion of the network re-entry process, the serving BS and the target BS allocate burst position information for the MS to the DL-MAP/UL-MAP for their sectors in step 735. In step 737, the serving BS and the target BS perform data exchange with the MS.

Figure 8:
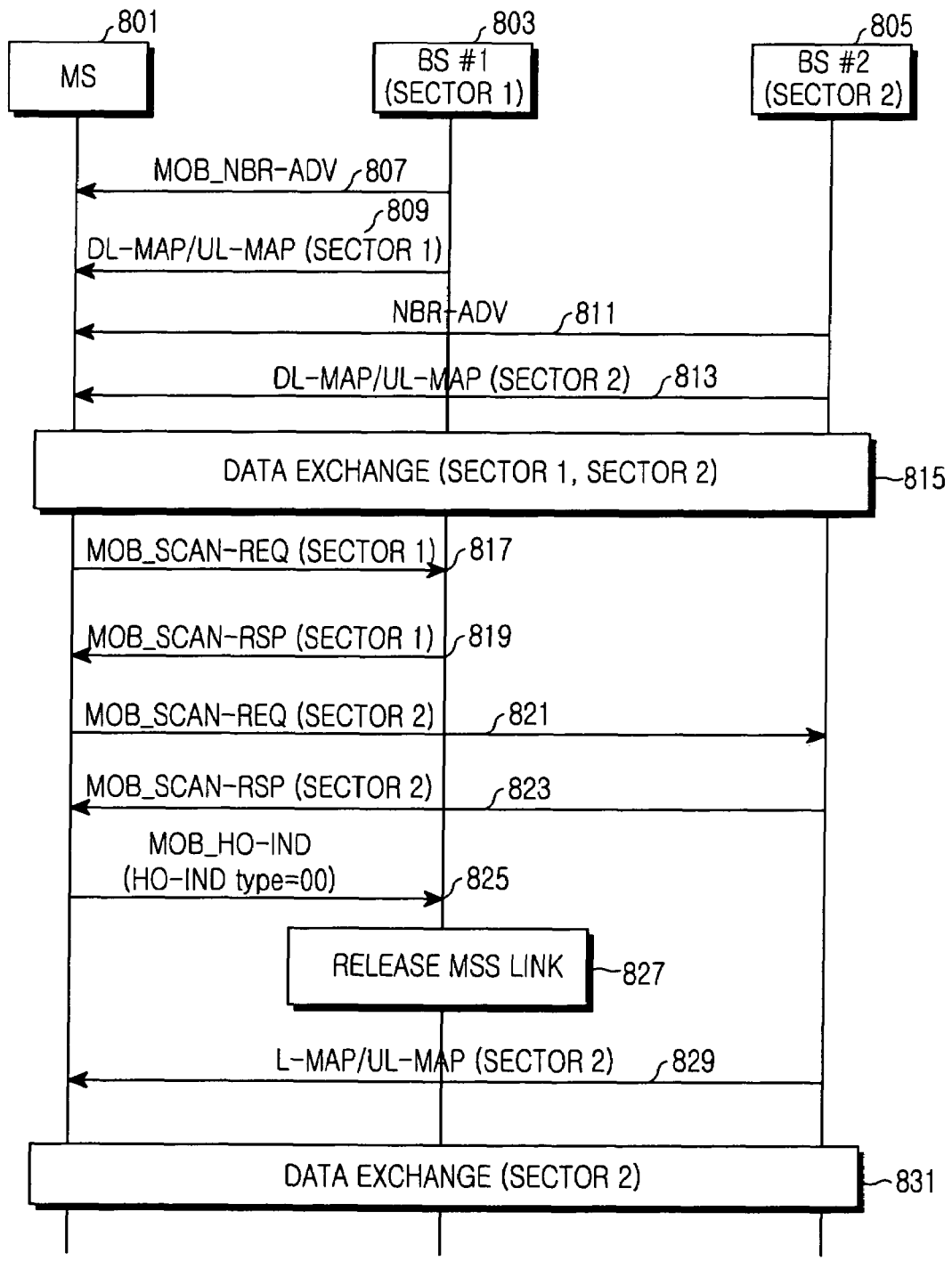
FIG. 8 is a signaling diagram illustrating a process of deleting a soft active sector from a soft active sector set in an IEEE 802.16e communication system according to an embodiment of the present invention.

FIG. 8 is a signaling diagram illustrating a process of deleting a soft active sector from a soft active sector set in an IEEE 802.16e communication system according to an embodiment of the present invention. Referring to FIG. 8, an MS 801 is exchanging data with both a sector#1 of a BS#1 803 and a sector#2 of a BS#2 805. Accordingly, the MS 801, located in the sector#1 of the BS#1 803 which is a current serving BS, receives a periodic MOB_NBR-ADV message from the BS#1 803 and the BS#2 805 thereby to receive information related to neighbor BSs and sectors (Steps 807 and 811). In addition, the MS 801 receives frames including the DL-MAP/UL-MAP related to the sector#1 and the sector#2 from the BS#1 803 and the BS#2 805 (Steps 809 and 813). The MS 801 receiving the DL-MAP/UL-MAP performs the data exchange with the BS#1 803 and the BS#2 805 (Step 815). Thereafter, upon detecting its departure from a handover region, the MS 801 transmits MOB_SCAN-REQ messages, scanning requests, to the BS#1 803 and the BS#2 805 (Steps 817 and 821), and receives MOB_SCAN-RSP messages, scanning responses, from the BS#1 803 and the BS#2 805 (Steps 819 and 823). After the scanning, the MS 801 deletes the sector#1 having a preamble CINR value less than a reference value H_delete from its soft active sector set, and transmits to the BS#1 803 a MOB_HO_IND message with HO_IND_type=00 to request release of its link (Step 825). Upon receiving the MOB_HO_IND message with HO_IND_type=00, the BS#1 803 releases the link to the MS 801 (Step 827). Thereafter, the MS 801 receives the DL-MAP/UL-MAP from only the BS#2 805 (Step 829), and performs data exchange with the BS#2 805 (Step 831).

Figure 9:
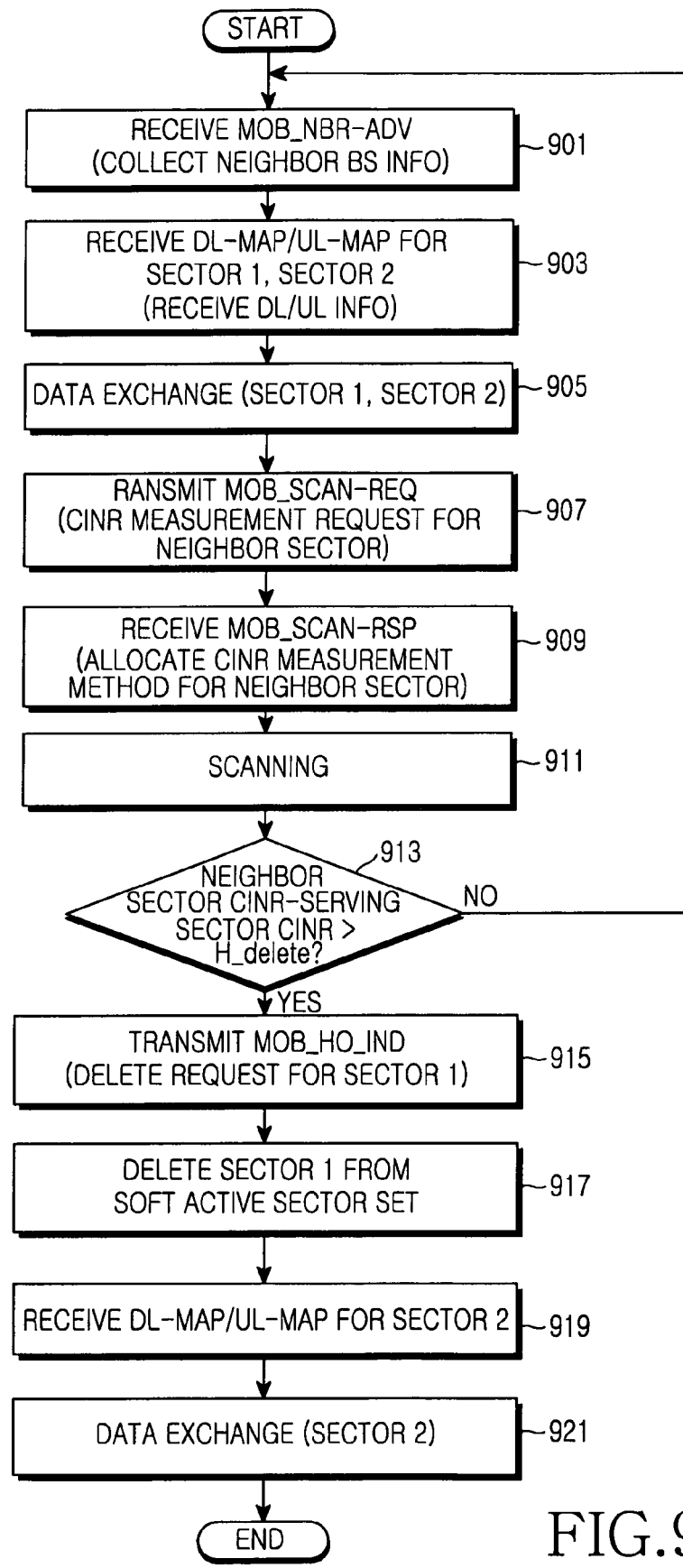
FIG. 9 is a flowchart illustrating a soft active sector deletion process performed by an MSS in an IEEE 802.16e communication system according to an embodiment of the present invention.

FIG. 9 is a flowchart illustrating a soft active sector deletion process performed by an MS in an IEEE 802.16e communication system according to an embodiment of the present invention. Referring to FIG. 9, in step 901, the MS 801 receives MOB_NBR-ADV messages from a BS#1 803 and a BS#2 805, to both of which links are currently set up, to collect information on its neighbor BSs and sectors. In step 903, the MS 801 receives DL-MAP/UL-MAP for the sector#1 of the BS#1 803 and the sector#2 of the BS#2 805. In step 905, the MS 801 performs data exchange with both sector#1 and sector#2. In step 907, the MS 801 transmits MOB_SCAN-REQ messages to the sector#1 and the sector#2 at a scanning request time. In step 909, the MS 801 receives MOB_SCAN-RSP messages from the sectors#1 and the sector#2 in response to the MOB_SCAN-REQ messages. In step 911, the MS 801 performs CINR scanning according to scanning information included in the MOB_SCAN-RSP messages.

The MS 801 determines in step 913 whether a difference between a CINR value for a neighbor sector and a CINR value for a serving sector is greater than a reference value H_delete. If the difference is greater than the reference value H_delete, the MS 801 proceeds to step 915 where it transmits a MOB_HO_IND message to the BS#1 803 to request release of its link, if not, the process returns to Step 901. In step 917, the MS 801 deletes the sector#1, which is a serving sector, from its soft active sector set. In step 919, the MS 801 receives DL-MAP/UL-MAP from the sector#2. In step 921, the MS 801 exchanges data with the sector#2 of the BS#2 805.

Figure 10:
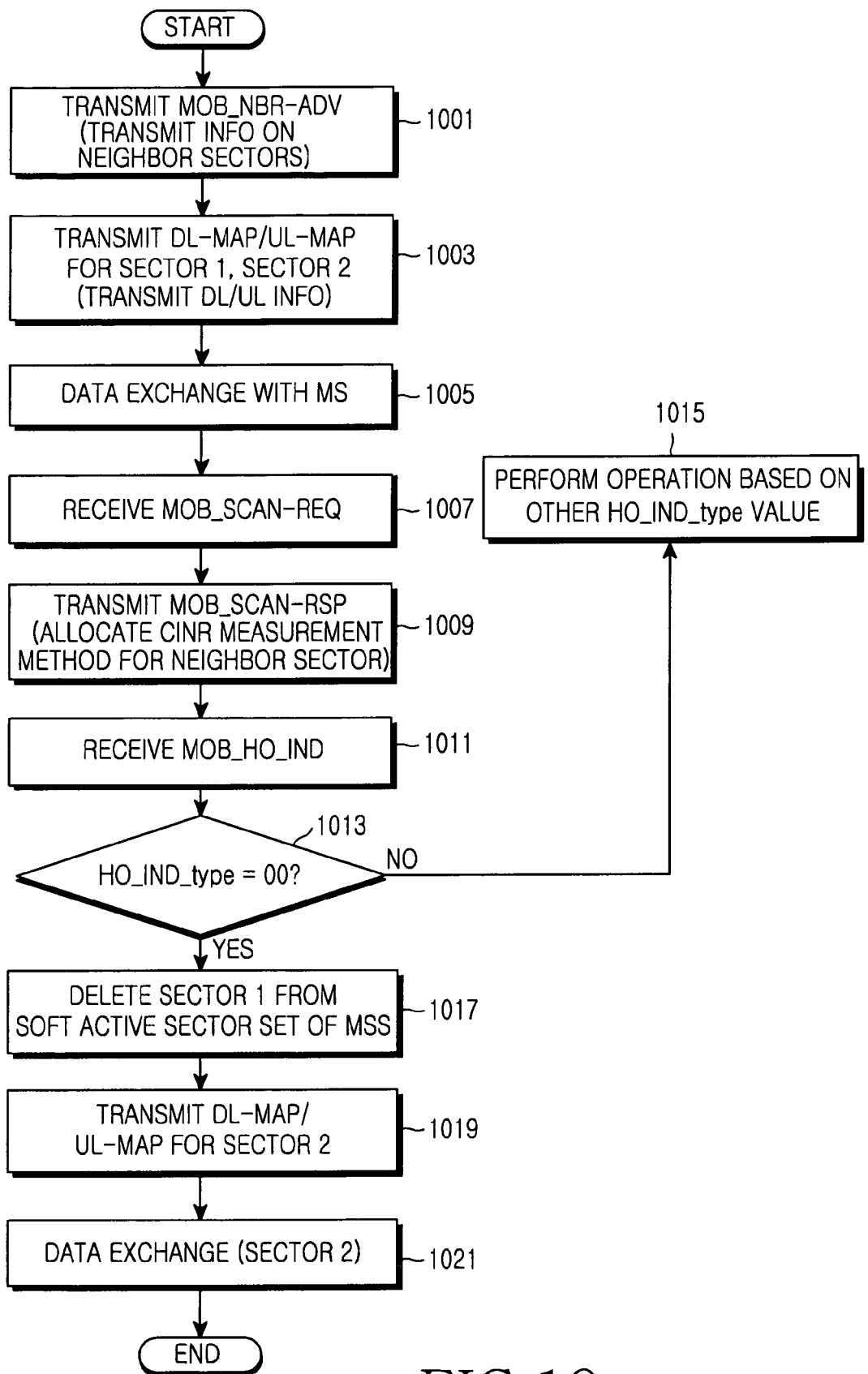
FIG. 10 is a flowchart illustrating a soft active sector deletion process performed by BSs in an IEEE 802.16e communication system according to an embodiment of the present invention.

FIG. 10 is a flowchart illustrating a soft active sector deletion process performed by BSs in an IEEE 802.16e communication system according to an embodiment of the present invention. Referring to FIG. 10, in step 1001, a BS#1 803 and a BS#2 805 periodically transmit the MOB_NBR-ADV messages to the MS 801 to inform the MS 801 of information on their sectors. In step 1003, the BS#1 803 and the BS#2 805 transmit DL-MAP/UL-MAP for a sector#1 and a sector#2, respectively. In step 1005, the BS#1 803 and the BS#2 805 exchange data with the MS 801. Thereafter, in step 1007, the BS#1 803 and the BS#2 805 receive MOB_SCAN-REQ messages from the MS 801. In step 1009, the BS#1 803 and the BS#2 805 transmit MOB_SCAN-RSP messages to the MS 801 to inform the MS 801 of a scanning method. In step 1011, the BS#1 803 receives a MOB_HO_IND message from the MSS 801. In step 1013, the BS#1 803 determines if a HO_IND_type field of the MOB_HO_IND message is set to '00'. If the HO_IND_type field is set to '00', the BS#1 803 proceeds to step 1017, otherwise, the BS#1 803 proceeds to step 1015 where it performs an operation according to the other HO_IND_type values. Because the BS#1 803 has recognized that MSS 801 is in a soft handover state (HO_type=10 of Table 20), the BS#1 803 is required to simply determine the HO_IND_type field.

In step 1017, if the sector#1 belongs to its soft active sector set, the BS#1 803 deletes the sector#1 from the soft active sector set and releases its link to the MS 801, and then proceeds to step 1019. The BS#1 803 can optionally provide the BS#2 805 with the information indicating that the sector#1 has been deleted from the soft active sector set and the link thereto can also be released. It is not necessary to inform the sector#2 of this information because sector managers share such information when there are the sector controller for controlling sectors in the network. When the sectors directly communicate with each other, it is necessary to inform the sector#2 of a change in the soft active sector set information.

As can be understood from the foregoing description, the present invention proposes a new message and scenario for the implementation of a soft handover of an MSS to ensure a high quality soft handover. In a downlink, a serving BS and a target BS transmit the same data to one MS through a radio channel having the same frequency at the same time. In an uplink, the serving BS and the target BS both receive a transmission signal from the MS. In this way, it is possible to prevent both the ping-pong effect and the reduction in signal strength in the cell boundary. In addition, due to application of the soft handover, in the downlink, the MS receives radio channels from two BSs, thereby increasing an SNR. Further, in the uplink, the two base stations simultaneously receive the transmission signals of the one MS, thereby obtaining a diversity effect.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for supporting a handover in a Broadband Wireless Access (BWA) communication system having a mobile station (MS), a serving base station (BS) from which the MS is currently receiving a service, and a plurality of neighbor BSs being different from the serving BS, the coverage area of each of the BSs being divided into sectors using different subchannel bands, the method comprising the steps of:

collecting, by the MS, information broadcasted from the serving BS on the serving BS and the neighbor BSs;

sending, by the MS, a scan request message to the serving BS;

sending, by the serving BS to the MS, a scan response message including a signal quality measurement method for measuring signals from the serving BS and the neighbor BSs in response to the scan request message;

measuring, by the MS, a signal level for each of the sectors of the serving BS and the neighbor BSs according to the collected information and the scan response message;

adding, by the MS, a second sector of a neighbor BS having quality that satisfies a reference range to a soft active sector set;

sending, by the MS, a handover request message including the measured signal level for each of the sectors, an arrival time difference indication field indicating whether soft handover is supported and whether an arrival time difference value is included in the handover request message, and the arrival time difference value being between a preamble transmitted from the serving BS and a preamble transmitted from the neighbor BS, wherein the arrival time difference value is included in the handover request message if a value of the arrival time difference indication field indicates that it is possible to support soft handover of the MS;

determining, by the serving BS, if the MS intends to perform a handover from a first sector of the serving BS to the second sector of the neighbor BS, based on the measured signal level, the arrival time difference indication field and the arrival time difference value included in the handover request message;

sending, by the serving BS, to the MS, a handover response message to permit the MS to perform the soft handover according to the determining result, when the serving BS determines to proceed with a soft handover of the MS if the arrival time difference value satisfies a predetermined range;

sending, by the MS, a handover indication message including a handover indication type field indicating a target BS is deleted or added in the soft active sector set and an identifier of the target BS; and receiving, by the MS, a first downlink (DL)-MAP/uplink (UL)-MAP message from the first sector of the serving BS and a second DL-MAP/UL-MAP message from the second sector on the neighbor BS after sending the handover indication message.

2. The method of claim 1, wherein the step of performing soft handover comprises the steps of:

sending, by the serving BS, to the neighbor BS a notification indicating that the MS performs a handover to the second sector of the neighbor BS;

receiving, from the neighbor BS, a response indicating whether to approve handover of the MS;

if the response is affirmative, transmitting to the MS the handover response message indicating that a soft handover to the second sector of the neighbor BS is possible;

upon receiving the response, sending by the MS to the serving BS a notification indicating that the MS performs the handover; and exchanging data with corresponding sectors of the BSs.

3. The method of claim 1, wherein the soft active sector set is a set of possible sectors to which the MS can perform a soft handover.

4. The method of claim 1, wherein the MS transmits to the serving BS a handover request message including information indicating if a soft handover to the second sector of the neighbor BS or the first sector of the serving BS is possible.

5. The method of claim 1, wherein unique preambles are transmitted from the sectors of the BSs.

6. A system for supporting a handover to a mobile station (MS) in a Broadband Wireless Access (BWA) communication system, the system comprising:

a serving base station (BS) from which the MS is currently receiving a service; and a plurality of neighbor BSs being different from the serving BS, the coverage area of each of the BSs being divided into sectors using different subchannel bands, wherein the MS collects periodically broadcast information on the serving BS, the neighbor BS, and the sectors, sends a scan request message to the serving BS, receives a scan response message including a signal quality measurement method for measuring signals from the serving BS and the neighbor BSs in response to the scan request message, measures a signal level for each of the sectors of the serving BS and the neighbor BSs according to the collected information and the scan response message, adds a second sector of a neighbor BS having a quality level that satisfies a reference range to a soft active sector set, sends a handover request message including the measured signal level for each of the sectors, an arrival time difference indication field indicating whether soft handover is supported and whether an arrival time difference value is included in the handover request message, and the arrival time difference value being between a preamble transmitted from the serving BS and a preamble transmitted from the neighbor BS, wherein the arrival time difference value is included in the handover request message if a value of the arrival time difference indication field indicates that it is possible to support soft handover of the MS, sends a handover indication message including a handover indication type field indicating a target BS is deleted or added in the soft active sector set and an identifier of the target BS, and receives a first downlink (DL)-MAP/uplink (UL)-MAP message from the first sector of the serving BS and a second DL-MAP/UL-MAP message from the second sector of the neighbor BS, wherein the serving BS broadcasts information on the serving BS and the neighbor BS to the MS, sends the scan response message, determines if the MS can perform a soft handover from its current first sector of the serving BS to the second sector of the neighbor BS, based on the measured signal level and the arrival time difference value included in the handover request message, and sends a handover response message to the MS to permit the MS to perform the soft handover if possible, and wherein the serving BS determines to proceed with the soft handover of the MS if the arrival time difference value satisfies a predetermined range.

7. The system of claim 6, wherein in order to perform the soft handover of the MS, the serving BS sends a notification indicating that the MS is to perform a handover to the second sector of the neighbor BS, receives a response from the neighbor BS in response to the notification, transmits to the MS a handover response indicating that a soft handover to the second sector of the neighbor BS is possible, if the response is affirmative, and receives from the MS a notification indicating that the MS performs soft handover.

8. The system of claim 6, wherein the MS performs ranging to a corresponding second sector of the neighbor BS.

9. The system of claim 6, wherein the soft active sector set is a set of possible sectors to which the MS can perform a soft handover.

10. The system of claim 6, wherein the MS sends a handover request message including information indicating if soft handover to the second sector of the neighbor BS is possible.

11. The system of claim 6, wherein unique preambles are transmitted from the sectors of the BSs.

12. A method for performing by a mobile station (MS) a handover from a sector of a serving base station (BS) to a sector of a neighbor BS in a Broadband Wireless Access (BWA) communication system having the MS, the serving BS from which the MS is currently receiving a service, and a plurality of neighbor BSs being different from the serving BS, the method comprising the steps of:

receiving, from a first sector of the serving BS, broadcast information on the serving BS and the neighbor BSs;

sending a scan request message to the serving BS;

receiving a scan response message including a signal quality measurement method for measuring signals from the serving BS and the neighbor BSs in response to the scan request message;

measuring a signal level for each of the sectors of the serving BS and the neighbor BSs according to the broadcast information and the scan response message;

adding a second sector of a neighbor BS having quality that satisfies a reference range to a soft active sector set;

sending, to the first sector of the serving BS, a handover request message including the measured signal level for each of the sectors, an arrival time difference indication field indicating whether soft handover is supported and whether an arrival time difference value is included in the handover request message, and the arrival time difference value being between a preamble transmitted from the serving BS and a preamble transmitted from the neighbor BS, wherein the arrival time difference value is included in the handover request message if a value of the arrival time difference indication field indicates that it is possible to support soft handover of the MS;

receiving, from the first sector of the serving BS, a handover response message including information of the second sector of a possible neighbor BS to which the MS can perform a soft handover to if a handover type determined in the serving BS is a soft handover;

sending, to the first sector of the serving BS, a handover indication message including a handover indication type field indicating a target BS is deleted or added in the soft active sector set and an identifier of the target BS;

receiving a first downlink (DL)-MAP/uplink (UL)-MAP message from the first sector of the serving BS and a second DL-MAP/UL-MAP message from the second sector of the neighbor BS after sending the handover indication message; and performing ranging to the second sector of the neighbor BS after receiving the DL-MAP/UL-MAP massages, wherein the coverage area of each of the BSs being divided into sectors using different subchannel bands.

13. The method of claim 12, wherein the soft active sector set is a set of possible sectors to which the MS can perform soft handover.

14. A method for supporting a handover by a serving base station (BS) in a Broadband Wireless Access (BWA) communication system having a mobile station (MS), the serving BS from which the MS is currently receiving a service, and a plurality of neighbor BSs being different from the serving BS, a coverage area of each of the BSs being divided into sectors using different subchannel bands, the method comprising the steps of:

broadcasting information on the serving BS and the neighbor BSs;

receiving a scan request message from the MS;

sending, to the MS, a scan response message including a signal quality measurement method for measuring signals from the serving BS and the neighbor BSs in response to the scan request message;

receiving, from the MS, a handover request message including the measured signal level for each of the sectors of the serving BS and the neighbor BSs, an arrival time difference indication field indicating whether soft handover is supported and whether an arrival time difference value is included in the handover request message, and the arrival time difference value being between a preamble transmitted from the serving BS and a preamble transmitted from the neighbor BS, wherein the arrival time difference value is included in the handover request message if a value of the arrival time difference indication field indicates that it is possible to support soft handover of the MS;

determining if the MS intends to perform a handover from a first sector of the serving BS to a second sector of the neighbor BS, based on the measured signal level and the arrival time difference value included in the handover request message; and sending, to the MS, a handover response message to permit the MS perform the soft handover if the MS can perform the soft handover from the first sector of the serving BS to the second sector of the neighbor BS when the serving BS determines to proceed with a soft handover of the MS if the arrival time difference value satisfies a predetermined range.

15. The method of claim 14, wherein the step of performing the soft handover comprises the steps of:
- sending to the neighbor BS a notification indicating that the MS is to perform a handover to the second sector of the neighbor BS;
- receiving from the neighbor BS a response indicating whether to approve handover;
- transmitting to the MS a handover response message indicating that the soft handover to the neighbor BS is possible, if the response message is affirmative; and
- receiving from the MS a notification indicating that the MS is to perform the soft handover.

16. The method of claim 14, wherein the serving BS receives from the MS a handover request including information indicating if soft handover to the second sector of the neighbor BS is possible.

17. The method of claim 14, wherein unique preambles are transmitted from the sectors of the BSs.

* * * * *

UNITED STATES PATENT AND TRADEMARK OFFICE
CERTIFICATE OF CORRECTION

| | | |
|---|---|---|
| PATENT NO. | : 7,593,732 B2 | Page 1 of 1 |
| APPLICATION NO. | : 11/153209 | |
| DATED | : September 22, 2009 | |
| INVENTOR(S) | : Kim et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 547 days.

Signed and Sealed this

Twenty-eighth Day of September, 2010

David J. Kappos
*Director of the United States Patent and Trademark Office*